(12) United States Patent
Doshi et al.

(10) Patent No.: US 12,158,531 B2
(45) Date of Patent: Dec. 3, 2024

(54) SWITCHING TRACKING LOOPS INSIDE GNSS RECEIVER BASED ON ADJUSTABLE SWITCHING THRESHOLD

(71) Applicant: SONY GROUP CORPORATION, Tokyo (JP)

(72) Inventors: Jignesh Doshi, Carlsbad, CA (US); Yohei Kajikawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 213 days.

(21) Appl. No.: 17/845,069

(22) Filed: Jun. 21, 2022

(65) Prior Publication Data

US 2023/0288572 A1    Sep. 14, 2023

Related U.S. Application Data

(60) Provisional application No. 63/269,026, filed on Mar. 8, 2022.

(51) Int. Cl.
  *G01S 19/24*         (2010.01)
(52) U.S. Cl.
  CPC .................. *G01S 19/24* (2013.01)
(58) Field of Classification Search
  CPC ....................................................... G01S 19/24
  USPC ................................................... 342/357.63
  See application file for complete search history.

(56) References Cited

U.S. PATENT DOCUMENTS

| 2006/0097914 | A1 | 5/2006 | Rao |
| 2011/0212718 | A1 | 9/2011 | Schoepf et al. |
| 2021/0325545 | A1* | 10/2021 | Broumandan .......... G01S 19/29 |

FOREIGN PATENT DOCUMENTS

| CN | 101776752 A | | 7/2010 | |
| CN | 112904383 A | * | 6/2021 | ............. G01S 19/29 |

OTHER PUBLICATIONS

Shu, et al., "A High Order Composite Automatic Frequency Control Costas Loop for Synchronization", IEEE, Aerospace Conference, Mar. 4-11, 2017, 9 pages.

* cited by examiner

*Primary Examiner* — Harry K Liu
(74) *Attorney, Agent, or Firm* — CHIP LAW GROUP

(57) ABSTRACT

A Global Navigation Satellite System (GNSS) and method for switching between Phase Locked Loop (PLL) and Automatic Frequency Control (AFC) tracking loops inside the GNSS receiver is provided. The GNSS receiver acquires a signal from a satellite of a GNSS satellite constellation and receives information associated with external conditions that impact a decoding performance, or a phase or frequency tracking performance, of the GNSS receiver. The GNSS receiver updates a value of a switching threshold based on the received information and compares a strength of the signal with the updated value. The GNSS receiver selects a tracking loop as one of AFC or PLL, based on the comparison. Thereafter, the GNSS receiver generates, by the selected tracking loop, measurements associated with parameters of a carrier component of the signal and decodes satellite data of the signal based on the measurements.

20 Claims, 10 Drawing Sheets

SWITCHING TRACKING LOOPS INSIDE GNSS RECEIVER BASED ON ADJUSTABLE SWITCHING THRESHOLD

CROSS-REFERENCE TO RELATED APPLICATIONS/INCORPORATION BY REFERENCE

This application claims priority to U.S. Provisional Patent Application Ser. No. 63/269,026 filed on Mar. 8, 2022, the entire content of which is hereby incorporated herein by reference.

FIELD

Various embodiments of the disclosure relate to satellite-based navigation. More specifically, various embodiments of the disclosure relate to a Global Navigation Satellite System (GNSS) receiver and a method for switching between tracking loops inside the GNSS receiver based on an adjustable switching threshold.

BACKGROUND

In a typical GNSS receiver, there is a measurement engine that tracks the received RF signal frequency and phase. This tracking may be done using a phase-locked loop (PLL) and/or an automatic frequency control (AFC) loop. While AFC may automatically keep a resonant circuit tuned to the frequency of an incoming radio signal, PLL may keep a resonant circuit tuned to the phase of the incoming radio signal. PLLs may be sensitive to dynamic stress (e.g., arm swings) but are typically useful for decoding satellite data. On the other hand, AFC may be less sensitive to dynamic stress but is typically less useful while decoding bits from the satellite. As a result, GNSS receivers may use a threshold to transition between AFC and PLL control loops. This switching threshold is typically static and may be hardcoded in the receiver.

Limitations and disadvantages of conventional and traditional approaches will become apparent to one of skill in the art, through comparison of described systems with some aspects of the present disclosure, as set forth in the remainder of the present application and with reference to the drawings.

SUMMARY

A Global Navigation Satellite System (GNSS) receiver and method for switching between tracking loops in the GNSS receiver based on an adjustable switching threshold, is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
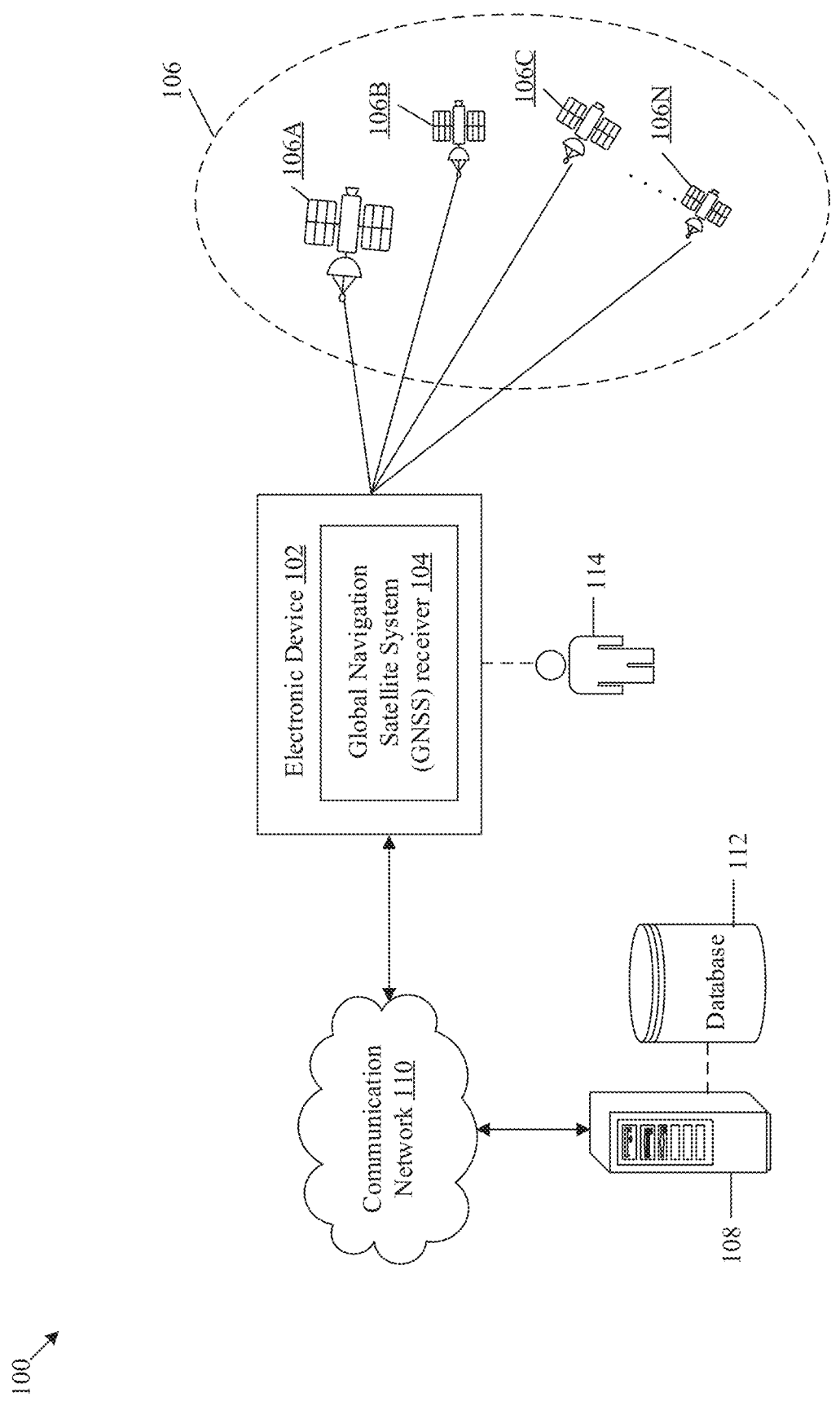
FIG. 1 is a diagram that illustrates an exemplary network environment for switching between tracking loops in a GNSS receiver based on an adjustable switching threshold, in accordance with an embodiment of the disclosure.

The following described implementations may be found in a disclosed Global Navigation Satellite System (GNSS) receiver and method for switching between tracking loops of the GNSS receiver based on an adjustable switching threshold. The tracking loops may include, for example, a Phase Locked Loop (PLL) and an Automatic Frequency Control (AFC) loop. Exemplary aspects of the disclosure provide an electronic device (for example, a wearable activity tracker, a cellphone, smart glasses, a navigation system, and the like) that includes a GNSS receiver. The GNSS receiver may acquire a signal from one or more satellites of a GNSS satellite constellation and may receive information (such as dynamic stress experienced by the GNSS receiver, motion of the GNSS receiver, or a strength of the acquired signal) associated with one or more external conditions that impact a decoding performance of the GNSS receiver, or a phase or frequency tracking performance of the GNSS receiver. The GNSS receiver may update a current value of a switching threshold based on the received information to obtain an updated value of the switching threshold. The GNSS receiver may compare a strength of the received signal with the updated value of the switching threshold and may select a tracking loop, as one of an Automatic Frequency Control (AFC) tracking loop or a Phase Locked Loop (PLL) tracking loop, based on the comparison of the strength of the received signal with the updated value of the switching threshold. The GNSS receiver may generate, by the selected tracking loop, measurements associated with one or more parameters (such as frequency or a phase) of a carrier component of the acquired signal and may decode satellite data of the acquired signal based on the measurements.

Typically, a conventional GNSS receiver utilizes a static switching threshold to switch between tracking loops in the conventional GNSS receiver. A conventional GNSS receiver may compare strength of a signal, acquired by the conventional GNSS receiver, with the static switching threshold. The conventional GNSS receiver may select the AFC tracking loop if the strength of the signal is less than the switching threshold. Similarly, the PLL tracking loop may be selected if the signal strength is greater than the switching threshold. However, there may be scenarios where the selection of the AFC or PLL tracking loop, based on the static switching threshold, may result in decoding errors, or phase or frequency tracking errors. For example, the switching threshold may be set as 28 dB Hz and the strength of the acquired signal may be 29 dB Hz. In this scenario, a conventional GNSS receiver may select the PLL tracking loop. The selection of the PLL tracking loop may result in decoding errors particularly if the conventional GNSS receiver is under a high dynamic stress due to the motion of the conventional GNSS receiver. As another example, the switching threshold may be set as 32 dB Hz and the strength of the acquired signal may be 31 dB Hz. In this scenario, switching to the PLL tracking loop from the AFC tracking loop may improve the decoding performance of the GNSS receiver, if the conventional GNSS receiver is under a low or 'no' dynamic stress. However, as the switching threshold is static, the GNSS receiver may not switch to the PLL tracking loop.

In order to address such issues, the proposed GNSS receiver may receive information associated with the one or more external conditions of the GNSS receiver. The GNSS receiver may update the switching threshold based on the one or more external conditions (for example, dynamic stress experienced by the GNSS receiver). The update of the switching threshold may enable an appropriate selection of the AFC or PLL tracking loops. The update may also enhance a decoding performance, a positioning accuracy, and a phase or frequency tracking performance of the GNSS receiver. For example, the GNSS receiver may increase the switching threshold level (from a current switching threshold level) if the GNSS receiver is under a high dynamic stress (i.e., a dynamic stress that is above a stress threshold). The increase in the switching threshold level may allow the GNSS receiver to select the AFC tracking loop (if strength of a signal, acquired by the GNSS receiver, is less than an updated switching threshold level). Similarly, the GNSS receiver may decrease the switching threshold level if the GNSS receiver is not under a dynamic stress or is under a limited dynamic stress. This may enable the GNSS to switch to the PLL tracking loop, and thereby enhance the decoding performance of the GNSS receiver or the positioning accuracy. In some instances, the decoding performance may be enhanced since the selection of the PLL tracking loop in a low dynamic stress environment may improve Bit Error Rate (BER) performance of the GNSS receiver.

FIG. 1 is a diagram that illustrates an exemplary network environment for switching between tracking loops in a GNSS receiver based on an adjustable switching threshold, in accordance with an embodiment of the disclosure. With reference to FIG. 1, there is shown a network environment 100. The network environment 100 includes an electronic device 102 that includes a GNSS receiver 104, a GNSS satellite constellation 106, and a server 108. The GNSS satellite constellation 106 may include a plurality of satellites, such as a satellite 106A, a satellite 106B, a satellite 106C, ..., and a satellite 106N. The number of satellites in the GNSS satellite constellation 106 in FIG. 1 are presented merely as an example and should not be construed as limiting for the disclosure. The GNSS receiver 104 may communicate with each of the plurality of satellites 106A ... 106N of the GNSS satellite constellation 106. In accordance with an embodiment, the electronic device 102 may communicate with the server 108, through one or more networks (such as a communication network 110). The server 108 may include a database 112, for example. There is further shown a user 114 associated with the electronic device 102 (or the GNSS receiver 104).

The electronic device 102 may include suitable logic, circuitry, interfaces, and/or code that may be configured to measure a level of dynamic stress experienced by the GNSS receiver 104. The dynamic stress may be related to a motion of the electronic device 102. The electronic device 102 may be further configured to predict a level of dynamic stress that the GNSS receiver 104 is likely to experience. The prediction may be based on a user input that indicates whether the GNSS receiver 104 is likely to experience dynamic stress. The electronic device 102 may be further configured to provide information that includes the measured and/or predicted levels of the dynamic stress, to the GNSS receiver 104. Examples of the electronic device 102 may include, but are not limited to, a wearable electronic device (such as a smartwatch, smart glasses, an Augmented Reality (AR) headset, a Virtual Reality (VR) headset, an extended reality (XR) headset, an AR goggle, or a VR goggle), an automotive navigation system, a flight management system (e.g., a telemetry unit of an unmanned aerial vehicle), a consumer electronic device, or any electronic device with a capability to integrate a GNSS receiver chipset.

The GNSS receiver 104 may include suitable logic, circuitry, code, and/or interfaces that may be configured to receive information, including ephemeris data of various satellites of the GNSS satellite constellation 106 orbiting the earth. The GNSS receiver 104 may be further configured to measure strength of signals received from the various satellites of the GNSS satellite constellation 106. The GNSS receiver 104 may individually decode the ephemeris data of one or more of the plurality of satellites 106A ... 106N to determine a position fix (i.e., a geographical position) of the electronic device 102. The GNSS receiver 104 may be further configured for execute measurement and tracking of positions of the electronic device 102, based on satellite's position, clock information, and other navigation information, which may be received via RF signals from one or more satellites of the plurality of satellites 106A ... 106N of the GNSS satellite constellation 106.

The GNSS receiver 104 may have a package configuration and a form factor, which may make it suitable for use with any electronic device (for example, the electronic device 102). Examples of the package configuration may include, but are not limited to, System on Chip (SoC)-based configuration, Field programmable gate arrays (FPGA)-based configuration, complex programmable logic device (CPLD)-based configuration, System in package (SiP)-based configuration, and Programmable System on Chip (PSoC)-based configuration. The GNSS receiver 104 may have a specification that describes data formats, protocols, encryptions, and the like. The specification of the GNSS receiver 104 may vary with a type of the GNSS satellite constellation 106 associated with the GNSS receiver 104.

The GNSS satellite constellation 106 may be a group of artificial satellites working together as a system and orbiting the earth in defined orbits and at specific altitudes. Each satellite of the GNSS satellite constellation 106 may periodically broadcast information, such as satellite's ephemeris, satellite's almanac, satellite's health and clock data, and ionospheric data to Earth. Such satellites may be controlled and monitored by a network of ground stations on Earth. Examples of the GNSS satellite constellation 106 may include, but are not limited to, Global Positioning System (GPS), Global Navigation Satellite System (GLONASS), Indian Regional Navigation Satellite System (IRNSS), Beidou System, and a Galileo System.

The server 108 may include suitable logic, circuitry, interfaces, and/or code that may be configured to receive requests, from the electronic device 102, for statistical data associated with a dynamic stress experienced by the GNSS receiver 104 or other GNSS receivers. The statistical data may indicate a variation of dynamic stress by different test users (or actual users) under different dynamic conditions, such as a swimming activity, a walking or running activity, a driving activity, or a gym activity. The statistical data may also indicate a signal strength associated with historical signals received from one or more satellites of the plurality of satellites 106A . . . 106N, and variations in the signal strength with respect to different levels of dynamic stress experienced by the GNSS receiver 104. The server 108 may be configured to transmit the statistical data to the electronic device 102 based on the requests.

The server 108 may execute operations through web applications, cloud applications, HTTP requests, repository operations, file transfer, and the like. Example implementations of the server 108 may include, but are not limited to, a database server, a file server, a web server, an application server, a mainframe server, a cloud computing server, or a combination thereof. In at least one embodiment, the server 108 may be implemented as a plurality of distributed cloud-based resources by use of several technologies that are well known to those ordinarily skilled in the art.

A person with ordinary skill in the art will understand that the scope of the disclosure may not be limited to the implementation of the server 108 and the electronic device 102 as two separate entities. In certain embodiments, the functionalities of the server 108 may be incorporated in its entirety or at least partially in the electronic device 102, without a departure from the scope of the disclosure.

The communication network 110 may include a communication medium through which the electronic device 102 and the server 108 may communicate with each other. The communication network 110 may be a wired or wireless communication network. Examples of the communication network 110 may include, but are not limited to, Internet, a Wireless Fidelity (Wi-Fi) network, a Personal Area Network (PAN), a Local Area Network (LAN), or a Metropolitan Area Network (MAN). The electronic device 102 may be configured to connect to the communication network 110, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity(Li-Fi), 802.16, IEEE 802.11s, IEEE 802.11g, multi-hop communication, wireless access point (AP), device to device communication, cellular communication protocols, and Bluetooth (BT) communication protocols.

The database 112 may include suitable logic, interfaces, and/or code that may be configured to store the statistical data associated with the dynamic stress experienced by the GNSS receiver 104. The database 112 may store different switching threshold (used for switching between the AFC and PLL tracking loops of the GNSS receiver 104) levels that have been set by the GNSS receiver 104, or other GNSS receivers, based on different levels of dynamic stress experienced by the GNSS receiver 104 at different times. The database 112 may also store relationships between the signal strength of the received signals, the dynamic stress experienced by the GNSS receiver 104, and the switching threshold levels set by the GNSS receiver 104 or other GNSS receivers. Such relationships may be derived by the electronic device 102 based on the statistical data. The GNSS receiver 104 may utilize the derived relationships to set the switching threshold based on requirements of the GNSS receiver 104 to track frequency or phase of an incoming signal. The database 112 may be a relational, a non-relational database, or a set of comma-separated values (csv) files in conventional or big-data storage. The database 112 may be stored or cached on a device, such as the server 108. The server 108 storing the database 112 may be configured to query for the statistical data associated with the dynamic stress experienced by the GNSS receiver 104. The database 112 may receive the query if the GNSS receiver 104 is required to update a current value of the switching threshold level. In response to the query, the server 108 may be configured to retrieve results (for example, the statistical data) from the database 112.

In some embodiments, the database 112 may be hosted on a plurality of servers stored at same or different locations. The operations of the database 112 may be executed using hardware including a processor, a microprocessor (e.g., to perform or control performance of one or more operations), a field-programmable gate array (FPGA), or an application-specific integrated circuit (ASIC). In some other instances, the database 112 may be implemented using software.

In operation, the GNSS receiver 104 of the electronic device 102 may be configured to acquire a signal from one or more satellites (for example, the satellite 106A) of the GNSS satellite constellation 106. For example, the GNSS receiver 104 may acquire the signal to extract navigation information or to decode ephemeris data of the acquired signal. The GNSS receiver 104 may be further configured to receive information associated with one or more external conditions of the GNSS receiver 104. In accordance with an embodiment, the information associated with the one or more external conditions may be received in a duration of the acquisition of the signal or may be received prior to or after the acquisition of the signal. In accordance with another embodiment, the information may be received periodically or based on one or more events (e.g., a sudden movement of the electronic device 102, a mode activated on the electronic device 102, or a user input). By way of example, and not limitation, the information may include an expected or actual dynamic stress experienced by the GNSS receiver 104, a strength of the acquired signal, a motion of the GNSS receiver 104 in a duration of the acquisition of the signal, or a Bit Error Rate (BER) associated with a decoding operation for a previously acquired signal. The received information may include a user input that indicates a selection of a GNSS provider from amongst a plurality of GNSS providers. The selected GNSS provider may be associated with the GNSS satellite constellation 106.

The one or more external conditions may have an impact on one or more of a decoding performance of the GNSS receiver 104, or a phase or frequency tracking performance of the GNSS receiver 104. For example, strength of signals may be different from satellites associated with different GNSS providers. In some instances, the strength of the signal, acquired from a selected GNSS provider (associated with the GNSS satellite constellation 106) may impact the frequency or phase tracking performance of the GNSS receiver 104. The phase tracking performance can improve if the strength of the acquired signal is greater than a threshold level (decibel-Hertz (dB-Hz)). Similarly, the phase tracking performance can degrade if the strength of the acquired signal is less than the threshold level. The phase tracking performance of the GNSS receiver 104 may, in turn, impact the decoding performance of the GNSS receiver 104. In some instances, the decoding performance may directly have an effect on the phase tracking performance of the GNSS receiver 104. Thus, the strength of a signal (acquired from a satellite associated with a selected GNSS provider) may have an impact on the phase tracking performance and the decoding performance.

As another example, the expected or actual dynamic stress experienced by the GNSS receiver 104 may impact the phase tracking or decoding performance of the GNSS receiver 104. The expected or actual dynamic stress may vary based on the motion of the GNSS receiver 104. For example, the GNSS receiver 104 may experience dynamics due to a movement of the user 114 or any device that include the GNSS receiver 104. The expected or actual dynamic stress may be greater a threshold when the user 114 runs compared to when the user 114 sits idle. The expected or actual dynamic stress may be directly proportional to a carrier phase-noise associated with the acquired signal. The expected or actual dynamic stress may also impact the decoding performance of the GNSS receiver 104, as the decoding performance may degrade if the carrier phase-noise is higher than a threshold phase-noise (cycles per second). Similarly, the decoding performance may improve if the carrier phase-noise is less than the threshold phase-noise (cycles per second). Thus, the expected or actual dynamic stress and/or the motion may impact the phase tracking performance of the GNSS receiver 104 and the decoding performance of the GNSS receiver 104.

In accordance with an embodiment, the expected or actual dynamic stress (or motion of the GNSS receiver 104) experienced by the GNSS receiver 104 may determine whether the frequency or the phase of the acquired signal needs to be tracked. The GNSS receiver 104 may be configured to select the frequency or phase of the acquired signal for tracking, for a duration of operation of the GNSS receiver 104, based on the expected or actual dynamic stress. The selection may be performed to improve the frequency or phase tracking performance of the GNSS receiver 104. The GNSS receiver 104 may be configured to track the frequency of the acquired signal in a high dynamic stress environment. Similarly, the GNSS receiver 104 may be configured to track the phase of the acquired signal in a low dynamic stress environment. The GNSS receiver 104 may track the phase of the acquired signal in low dynamic stress environment since the phase tracking performance of the GNSS receiver 104 improves in the low dynamic stress environment. As the decoding performance of the GNSS receiver 104 is directly proportional to the phase tracking performance of the GNSS receiver 104, the decoding performance of the GNSS receiver 104 may improve in a low dynamic stress environment.

In some instances, the BER (external condition) associated with a decoding operation for a previously acquired signal may impact the decoding performance of the GNSS receiver 104, or a phase or frequency tracking performance the GNSS receiver 104. In accordance with an embodiment, the GNSS receiver 104 may be configured to track the phase of the acquired signal if the BER is less than a predefined threshold BER. The threshold BER may be set based on a type of service that is availed by the GNSS receiver 104 based on the acquisition of the signal from the one or more satellites of the GNSS satellite constellation 106. Because a low BER may indicate that the GNSS receiver 104 may be able to decode satellite data without an error (i.e., the decoding performance may improve). Similarly, the GNSS receiver 104 may track the frequency of the acquired signal if the BER is greater than the predefined threshold BER.

Once the information associated with one or more external conditions is received, the GNSS receiver 104 may be further configured to update a current value of a switching threshold. The current value of the switching threshold may be updated, based on the received information, to obtain an updated value of the switching threshold. Initially, the GNSS receiver 104 may set the switching threshold to the current value. The current value of the switching threshold may be updated to improve the decoding performance of the GNSS receiver 104, the phase tracking performance of the GNSS receiver 104, or the frequency tracking performance of the GNSS receiver 104.

In accordance with an embodiment, the GNSS receiver 104 may include the AFC tracking loop and the PLL tracking loop. The GNSS receiver 104 may track the frequency of the acquired signal by use of the AFC tracking loop. Similarly, the GNSS receiver 104 may track the phase of the acquired signal by use of the PLL tracking loop. The switching threshold may be used to switch between the AFC and PLL tracking loops based on a strength of an acquired signal.

In accordance with an embodiment, if the strength of the acquired signal is less than the switching threshold, the GNSS receiver 104 may track the frequency of the acquired signal by use of the AFC tracking loop. Similarly, if the strength of the acquired signal is more than the switching threshold, the GNSS receiver 104 may track the phase of the acquired signal by use of the PLL tracking loop. The phase of the acquired signal may be tracked to improve the phase tracking performance and the decoding performance of the GNSS receiver 104.

In accordance with an embodiment, the GNSS receiver 104 may update the switching threshold such that the updated value of the switching threshold is greater than a current value of the switching threshold. The updated value may be greater than the current value in conditions, such as when the GNSS receiver 104 is under a high dynamic stress environment (i.e., above a stress threshold) or is in motion, or when the BER associated with a decoding operation is greater than a threshold BER, and the like. In such conditions, the GNSS receiver 104 may increase the current value of the switching threshold level. The increasing of the switching threshold level, from the current value to the updated value, may prevent occurrence of a condition in which the strength of the acquired signal is greater than the updated switching threshold level in a high dynamic stress environment.

In accordance with an embodiment, the GNSS receiver 104 may update the switching threshold such that the updated value of the switching threshold is less than the current value of the switching threshold. The updated value may be less than the current value in conditions, such as when the GNSS receiver 104 is under a low dynamic stress environment or is at rest, when the BER associated with a decoding operation is less than the threshold BER. The GNSS receiver 104 may decrease the switching threshold level from the current value to the updated value to prevent a condition in which the strength of the acquired signal is less than the switching threshold level in a low dynamic stress environment. The update of the switching threshold may improve the phase tracking efficiency or a decoding efficiency of the GNSS receiver 104.

After the threshold update, the GNSS receiver 104 may be configured to compare a strength of the acquired signal with the updated value of the switching threshold. From the comparison, the GNSS receiver 104 may determine whether the strength of the acquired signal is greater than or less than the updated value of the switching threshold. In some instances, the strength of the acquired signal may be less than the updated value of the switching threshold due to high dynamic stress experienced by the GNSS receiver 104. In other instances, the strength of the acquired signal may be greater than the updated value of the switching threshold if the GNSS receiver 104 is in a low dynamic stress environment.

The GNSS receiver 104 may be further configured to select a tracking loop as one of the AFC tracking loop or the PLL tracking loop based on the comparison. In accordance with an embodiment, the GNSS receiver 104 may determine active use of the AFC tracking loop for a first duration of operation of the GNSS receiver 104. In such a case, the PLL may be selected as the tracking loop based on the comparison. The selection of the PLL may cause the GNSS receiver 104 to switch from the AFC tracking loop to the PLL for a second duration of operation that succeeds the first duration of operation of the GNSS receiver 104. Alternatively, the GNSS receiver 104 may determine active use of the PLL for a third duration of operation of the GNSS receiver 104. In such a case, the AFC tracking loop may be selected as the tracking loop based on the comparison. The selection of the AFC tracking loop may cause the GNSS receiver 104 to switch from the PLL to the AFC tracking loop for a fourth duration of operation that succeeds the third duration of operation of the GNSS receiver 104.

In accordance with an embodiment, the GNSS receiver 104 may select the AFC tracking loop if the strength of the acquired signal is less than the updated value of the switching threshold. For example, in a high dynamic stress environment, the AFC tracking loop may be selected to track the frequency of the acquired signal. Alternatively, the GNSS receiver 104 may select the PLL tracking loop if the strength of the acquired signal is more than the updated value of the switching threshold. For example, if the GNSS receiver 104 is in a low dynamic stress environment, the PLL tracking loop may be selected to track the phase of the acquired signal. The use of the PLL tracking loop for tracking of the phase of the acquired signal in a low dynamic stress environment may improve the phase tracking and decoding performance of the GNSS receiver 104.

The GNSS receiver 104 may be further configured to generate, by the selected tracking loop, measurements associated with one or more parameters of a carrier component of the acquired signal. In accordance with an embodiment, the one or more parameters of the carrier component of the acquired signal may include a frequency of the carrier component or a phase of the carrier component. The GNSS receiver 104 may measure the frequency of the carrier component of the acquired signal based on selection of the AFC tracking loop or the PLL tracking loop. Thereafter, the GNSS receiver 104 may decode satellite data of the signal based on the measurements. Specifically, the measurements may be used to generate a local reference signal that matches the phase and frequency of the acquired signal. In accordance with an embodiment, the satellite data may include ephemeris data, navigation data, or the like.

Figure 2:
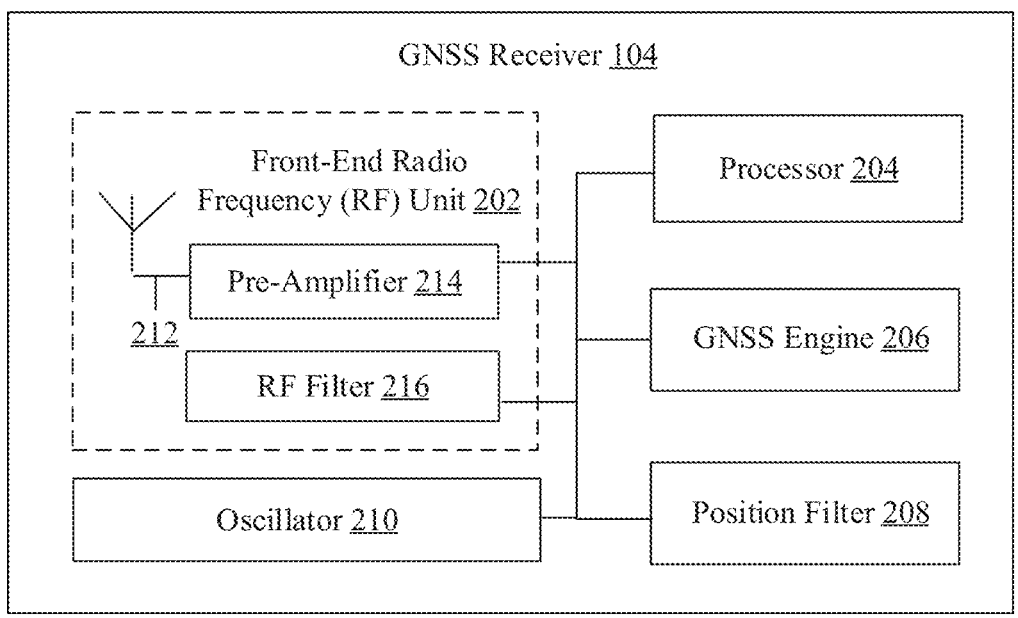
FIG. 2 is a block diagram of the GNSS receiver of FIG. 1, in accordance with an embodiment of the disclosure.

FIG. 2 is a block diagram of the GNSS receiver of FIG. 1, in accordance with an embodiment of the disclosure. FIG. 2 is explained in conjunction with elements from FIG. 1. With reference to FIG. 2, there is shown a block diagram 200 of the GNSS receiver 104. The GNSS receiver 104 may include a front-end Radio Frequency (RF) unit 202, a processor 204, a GNSS engine 206, a position filter 208, and an oscillator 210.

In at least one embodiment, the front-end RF unit 202 may include an antenna 212, a pre-amplifier 214, and a RF filter 216. The antenna 212 may be configured to receive RF signals from one or more satellites (such as the satellite 106A) of the GNSS satellite constellation 106. The RF signals may include ephemerides or ephemeris data of such satellites. Examples of the antenna 212 may include, but are not limited to, a quadrifilar antenna, a patch or microstrip antenna, a dipole antenna, a choke ring antenna, a helix antenna, or a planar ring antenna.

The pre-amplifier 214 may be configured to amplify the RF signals received by the antenna 212. As the received RF signals may be weak, the pre-amplifier 214 may be required to increase the power of the received RF signals while ensuring that the gain in power is higher than the noise included in the received RF signals.

The RF filter 216 may be configured to improve a selectivity of the front-end RF unit 202 of the GNSS receiver 104. Specifically, the RF filter 216 may reject image frequencies and may block out-of-band interfering signals from the amplified RF signals. Examples of the RF filter 216 may include, but not limited to, Bulk Acoustic Wave (BAW) filter, Surface Acoustic Wave (SAW) filter, or any other RF filter. In case the RF filter 216 is implemented as a SAW filter or a BAW filter, the RF filter 216 may operate based on conversion of electrical energy into acoustic or mechanical energy on a piezoelectric material.

The processor 204 may include suitable logic, circuitry, interfaces, and/or code that may be configured to execute program instructions associated with different operations to be executed by the GNSS receiver 104. The processor 204 may control all components of the GNSS receiver 104. The operations to be executed by the GNSS receiver 104 may include acquisition of a signal from one or more satellites of the GNSS satellite constellation 106, reception of information associated with one or more external conditions that impact one or more of a decoding performance of the GNSS receiver 104 or a phase or frequency tracking performance of the GNSS receiver 104, updating of a current value of a switching threshold based on the received information to obtain an updated value of the switching threshold, comparison of a strength of the received signal with the updated value of the switching threshold, selection of a tracking loop as one of an AFC tracking loop or a PLL based on the comparison, performance of measurements associated with one or more parameters of a carrier component of the signal, and decoding of satellite data from the acquired signal based on the measurements.

In some embodiments, the processor 204 may be further configured to extract and decode ephemeris data and other information from the signal. The processor 204 may be configured to estimate positions of one or more satellites of the plurality of satellites 106A . . . 106N of the GNSS satellite constellation 106 based on the decoded ephemeris data. In an embodiment, the processor 204 may be configured to execute position fixing operation of the GNSS receiver 104. Examples of the processor 204 may be an x86-based processor, an x64-based processor, a Reduced Instruction Set Computing (RISC) processor, an Application-Specific Integrated Circuit (ASIC), a Complex Instruction Set Computing (CISC) processor, a field-programmable gate array-based processor, a specialized digital signal processor (DSP), or other processors, and the like.

The GNSS engine 206 of the GNSS receiver 104 may be configured to execute operations of the GNSS receiver 104 on the processor 204. The GNSS engine 206 may include several modules, such as a measurement unit, tracking unit, or a navigation unit. Each of such modules may be implemented as program instructions, specialized circuitry, or a combination thereof. The GNSS engine 206 may be configured to track frequency and/or phase of the acquired signal by use of an AFC tracking loop or a PLL tracking loop. The AFC tracking loop may be configured to track the frequency of the acquired signal by use of a resonant circuit tuned to the frequency of the acquired signal. The PLL tracking loop may be configured to track the phase of the acquired signal by use of a resonant circuit tuned to the phase of the acquired signal.

The position filter 208 may include suitable logic, circuitry, interfaces, and/or code that may be configured to determine a position fix for the GNSS receiver 104 (i.e., the electronic device 102 or the user 114) based on estimated positions of at least four satellites of the GNSS satellite constellation 106. In some instances, the position filter 208 may be implemented as a software component, as something running on the GNSS receiver 104 and may implement Kalman filtering or least-square estimators to determine the position fix. In some embodiments, the position filter 208 may be controlled or reset to utilize correctly decoded ephemeris. Typically, a position filter is affected by its previous state. If mis-decoded ephemeris is used in previous measurement, then the position of the GNSS receiver 104 may need to be recovered immediately without dragging wrong information, as soon as correct ephemeris is decoded.

The oscillator 210 may be configured to provide mechanical resonance of a vibrating crystal, thereby creating an electrical signal of a particular frequency. In an embodiment, the oscillator 210 may be a crystal oscillator with a temperature sensitive reactance circuit in order to compensate frequency-temperature characteristics of the crystal. Examples of the oscillator 210 may include, but are not limited to, a temperature compensated crystal oscillator (TCXO), Oven controlled crystal oscillator (OCXO), or any other crystal oscillator.

A person of ordinary skill in the art will understand that the GNSS receiver 104 in FIG. 2 may include other suitable components or systems (for example, analog filters, intermediate frequency (IF) mixers or amplifiers, down-converters, A/D converters, and the like), in addition to the components or systems which are illustrated herein to describe and explain the function and operation of the present disclosure. A detailed description for the other components or systems of the GNSS receiver 104 has been omitted from the disclosure for the sake of brevity.

The functions or operations executed by the GNSS receiver 104, as described in FIG. 1, may be performed by the processor 204. Operations executed by the processor 204 are described in detail, for example, in FIGS. 5, 6, 7, 8, and 9.

Figure 3:
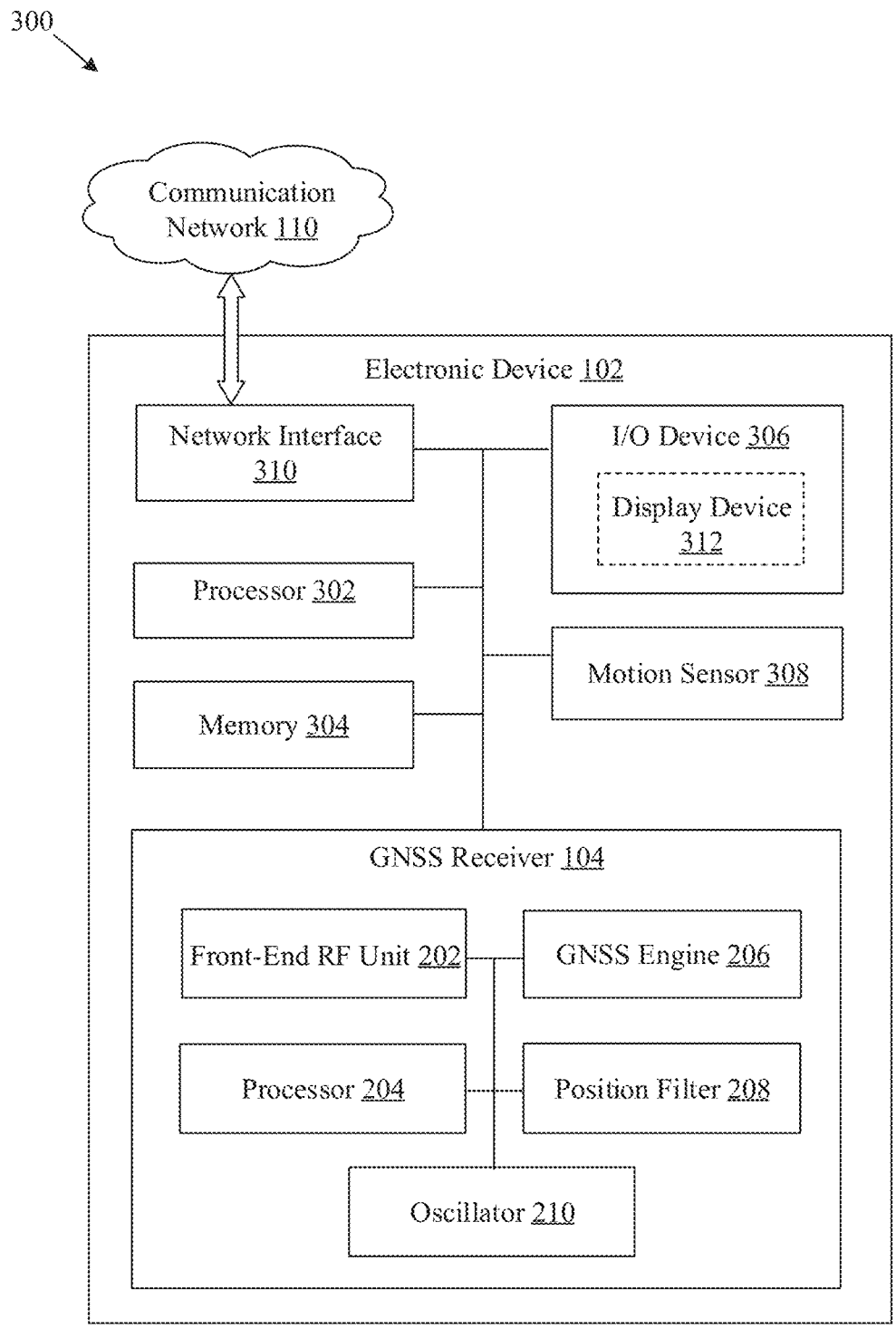
FIG. 3 is a block diagram that illustrates an exemplary electronic device that includes the GNSS receiver of FIG. 2, in accordance with an embodiment of the disclosure.

FIG. 3 is a block diagram that illustrates an exemplary electronic device that includes the GNSS receiver of FIG. 2, in accordance with an embodiment of the disclosure. FIG. 3 is explained in conjunction with elements from FIG. 1 and FIG. 2. With reference to FIG. 3, there is shown a block diagram 300 of the electronic device 102. The electronic device 102 may include the GNSS receiver 104, a processor 302, a memory 304, an input/output (I/O) device 306, a motion sensor 308, and a network interface 310. In at least one embodiment, the I/O device 306 may also include a display device 312. The processor 302 may be communicatively coupled to the GNSS receiver 104, the memory 304, the I/O device 306, and the network interface 310, through wired or wireless communication of the electronic device 102.

The processor 302 may include suitable logic, circuitry, and interfaces, and/or code that may be configured to execute program instructions associated with different operations to be executed by the electronic device 102. In accordance with an embodiment, the operations may be associated with the GNSS receiver 104. The operations include reception of information associated with one or more external conditions that impact one or more of a decoding performance of the GNSS receiver 104 or a phase or frequency tracking performance of the GNSS receiver 104, updating of a current value of a switching threshold based on the received information to obtain an updated value of the switching threshold, comparison of a strength of the received signal with the updated value of the switching threshold, selection of a tracking loop as one of an AFC tracking loop or a PLL based on the comparison, performance of measurements associated with one or more parameters of a carrier component of the signal, and decoding of satellite data from the acquired signal based on the measurements.

In some embodiments, the processor 302 may be configured to predict the dynamic stress that may be experienced by the GNSS receiver 104 based on user inputs The processor 302 may be configured to determine an actual level of dynamic stress experienced by the GNSS receiver 104 based on inputs received from the motion sensor. The processor 302 may be configured to send the predicted level of expected dynamic stress and/or the actual level of dynamic stress to the GNSS engine 206.

The processor 302 may include one or more specialized processing units, which may be implemented as an integrated processor or a cluster of processors that perform the functions of the one or more specialized processing units, collectively. The processor 302 may be implemented based on a number of processor technologies known in the art. Examples of implementations of the processor 302 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other computing circuits.

The memory 304 may include suitable logic, circuitry, interfaces, and/or code that may be configured to store the program instructions to be executed by the processor 302. The program instructions stored on the memory 304 may enable the processor 302 to execute the operations associated with the GNSS receiver 104. In at least one embodiment, the memory 304 may store the received information associated with external conditions that impact decoding performance of the GNSS receiver 104 or a phase or frequency tracking performance of the GNSS receiver 104. The memory 304 may further store statistical data, associated with dynamic stress experienced by the GNSS receiver 104, obtained from the database 112. Examples of implementation of the memory 304 may include, but are not limited to, Random Access Memory (RAM), Read Only Memory (ROM), Electrically Erasable Programmable Read- Only Memory (EEPROM), Hard Disk Drive (HDD), a Solid-State Drive (SSD), a CPU cache, and/or a Secure Digital (SD) card.

The I/O device 306 may include suitable logic, circuitry, interfaces, and/or code that may be configured to receive an input and provide an output based on the received input. In accordance with an embodiment, the input may be associated with an external condition that impacts a decoding performance of the GNSS receiver 104 or a phase or frequency tracking performance of the GNSS receiver 104. For example, the I/O device 306 may receive a user input from the user 114. The user input may be indicative of an expected dynamic stress that may be experienced by the GNSS receiver 104. The user input may indicate whether the user intends to operate the electronic device 102 (for example, a smart watch) in 'running mode' or 'walking' mode. The expected dynamic stress level may be determined based on the user input as the expected dynamic stress level in 'running mode' may be higher compared to expected dynamic stress level in 'walking mode'. The I/O device 306 may render, as output, the expected level of dynamic stress that may be experienced by the GNSS receiver 104 or a currently measured level of the dynamic stress being experienced by the GNSS receiver 104.

In another example, the user input may be indicative of a selection of a GNSS provider from amongst a plurality of GNSS providers. The selected GNSS provider may be associated with a GNSS satellite constellation (for example, the GNSS satellite constellation 106). The I/O device 306 may render an output that indicates the selected GNSS satellite constellation 106 and the one or more satellites (for example, the satellite 106A) from where the signal is acquired. The I/O device 306 may render one or more parameters of the acquired signal such as received signal power, signal strength, frequency, or the like. Examples of the I/O device 306 may include, but are not limited to, a touch screen, a keyboard, a mouse, a joystick, a microphone, the display device 312, and a speaker.

The I/O device 306 may include the display device 312. The display device 312 may include suitable logic, circuitry, and interfaces that may be configured to receive inputs from the processor 302 to render, on a display screen, an interface that allows the user 114 to provide the user inputs. In at least one embodiment, the display screen may be at least one of a resistive touch screen, a capacitive touch screen, or a thermal touch screen. The display device 312 or the display screen may be realized through several known technologies such as, but not limited to, at least one of a Liquid Crystal Display (LCD) display, a Light Emitting Diode (LED) display, a plasma display, or an Organic LED (OLED) display technology, or other display devices.

The motion sensor 308 may include suitable logic, circuitry, interfaces, and/or code that may estimate motion or movement of the GNSS receiver 104. The movement or motion may be estimated based on a linear or an angular displacement of the GNSS receiver 104. The actual dynamic stress experienced by the GNSS receiver 104 may be determined based motion or movement of the GNSS receiver 104 estimated by the motion sensor 308. Example of the motion sensor 308 may include, but are not limited to, Hall effect sensors, variable reluctance speed sensors, RF speed sensors, accelerometer-based speed sensors, optical speed sensors, or the like.

The network interface 310 may include suitable logic, circuitry, and interfaces that may be configured to facilitate a communication between the processor 302 of the electronic device 102 and the server 108, via the communication network 110. The network interface 310 may be implemented by use of various known technologies to support wired or wireless communication of the electronic device 102 with the communication network 110. The network interface 310 may include, but is not limited to, an antenna, a RF transceiver, one or more amplifiers, a tuner, one or more oscillators, a digital signal processor, a coder-decoder (CODEC) chipset, a subscriber identity module (SIM) card, or a local buffer circuitry.

The network interface 310 may be configured to communicate via wireless communication with networks, such as the Internet, an Intranet, or a wireless network, such as a cellular telephone network, a wireless local area network (LAN), a short-range communication network, and a metropolitan area network (MAN). The wireless communication may use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5th Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a near field communication protocol, and a wireless pear-to-pear protocol.

The functions or operations associated with the GNSS receiver 104, executed by the electronic device 102, as described in FIG. 1, may be performed by the processor 302. Operations executed by the processor 302 are described in detail, for example, in FIGS. 5, 6, 7, 8, and 9.

Figure 4:
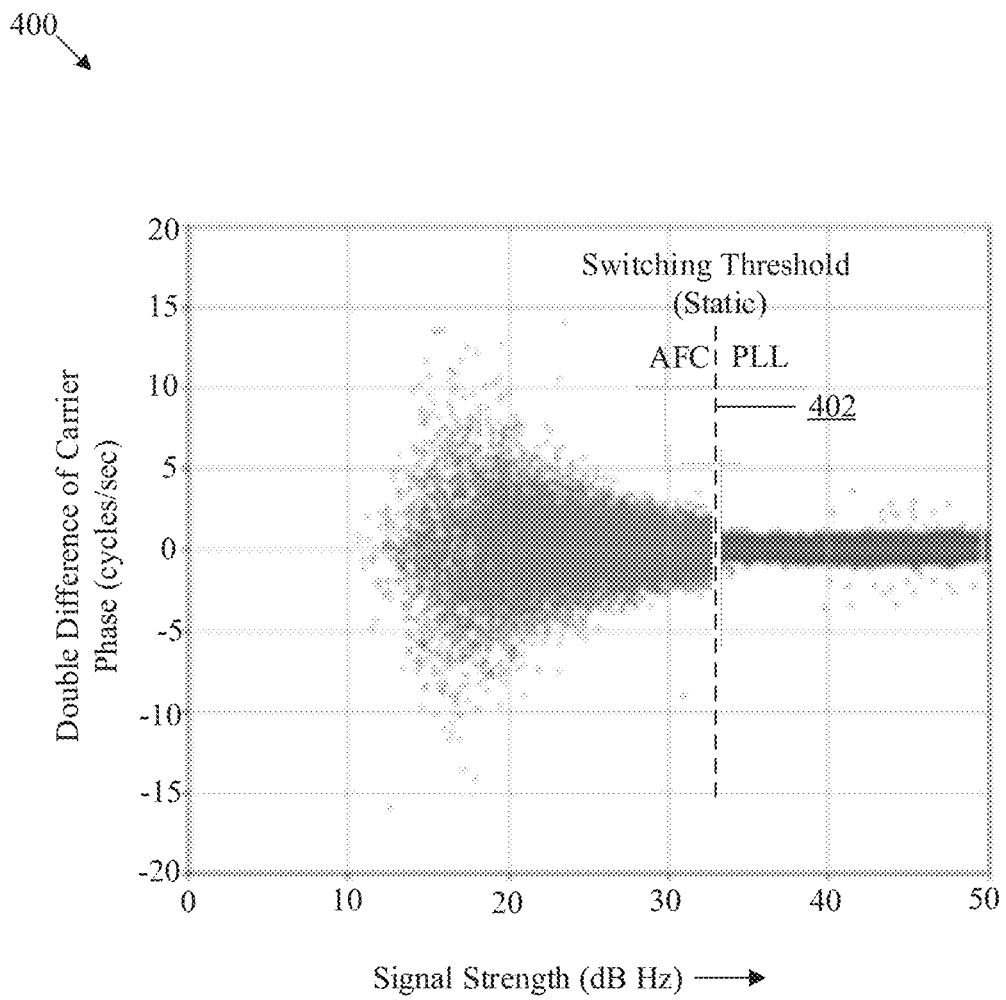
FIG. 4 is an exemplary graph that illustrates a static switching threshold used to control selection of a tracking loop in a GNSS receiver based on a strength of an acquired signal.

FIG. 4 is an exemplary graph that illustrates a static switching threshold used to control selection of a tracking loop based on a strength of an acquired signal. FIG. 4 is explained in conjunction with elements from FIG. 1, FIG. 2, and FIG. 3. With reference to FIG. 4, there is shown an exemplary graph 400. In exemplary graph 400, there is shown a variation of a signal strength (measured in terms of dB-Hz) of a signal (acquired from a satellite) with respect to a double difference of carrier phase (measured in terms of cycles per second). The double difference of carrier phase may be also referred to as a phase noise of the carrier component or carrier phase-noise. There is further shown a switching threshold 402 (in dB-Hz). A GNSS receiver may typically select an AFC or a PLL tracking loop based on the strength of the acquired signal.

As shown, for example, the switching threshold level 402 may be set at 32 dB Hz (approximate level). The GNSS receiver may select the AFC tracking loop for tracking the frequency of the acquired signal if strength of the acquired signal is less than 32 dB Hz. The AFC tracking loop may be selected for tracking the frequency of the acquired signal. In the AFC tracking loop, the carrier phase noise may increase (as shown by an outward spread of data in FIG. 4), which may degrade the phase tracking performance of the GNSS receiver and the decoding performance of the GNSS receiver.

The GNSS receiver may select the PLL tracking loop to track the phase of the acquired signal if strength of the acquired signal is greater than or equal to 32 dB Hz. In PLL tracking loop, the carrier phase noise may be low. The use of the PLL tracking loop to track the phase of the acquired signal may enhance the phase tracking and the decoding performance of the GNSS receiver 104.

In some instances, the strength of the acquired signal may be affected by one or more external conditions, such as an expected or actual dynamic stress experienced by the GNSS receiver 104 or a motion of the GNSS receiver 104. If the expected or actual dynamic stress experienced by the GNSS receiver 104 increases in a duration of the acquisition of the signal from one or more satellites (for example, the satellite 106A), then the strength of acquired signal may decrease. For example, the GNSS receiver 104 may track the phase of the signal with a strength of 37 dB Hz. At any time-instant, the strength of the acquired signal may decrease from 37 dB Hz to 32 dB Hz along with an increase in the actual dynamic stress experienced by the GNSS receiver 104. In this scenario, the GNSS receiver 104 may continue to track the phase of the acquired signal irrespective of increase in the carrier phase noise (i.e., due to the increase in the actual dynamic stress experienced by the GNSS receiver 104). The phase tracking and decoding performance of the GNSS receiver 104 may progressively deteriorate if the dynamic stress experienced by the GNSS receiver 104 does not decrease and/or the strength of the acquired signal does not increase beyond 32 dB Hz. The GNSS receiver 104 may not switch to the AFC tracking loop since the switching threshold 402 is static and set at 32 dB Hz. The switching may take place if the strength of the acquired signal is reduced to at least 31 dB Hz.

The performance of the GNSS receiver 104 may improve if the GNSS receiver 104 is provided with information associated with external conditions that impact the performance of the GNSS receiver 104. The switching threshold 402 can be made configurable or adjustable based on the external conditions (for example, the expected or actual dynamic stress experienced by the GNSS receiver 104 or the motion of the GNSS receiver 104). In typical GNSS receivers, the switching threshold 402 is static and the GNSS receivers may not update the switching threshold 402 based on the external conditions. On the other hand, the GNSS receiver 104 of the present disclosure may update the switching threshold 402 (for example, update the switching threshold 402 to 33 dB Hz from the current value of 32 dB Hz) based on an increase or a decrease in the dynamic stress experienced by the GNSS receiver 104. The GNSS receiver 104 may be configured to select the AFC tracking loop for tracking of the frequency of the acquired loop based on the update of the switching threshold 402. For example, the GNSS receiver 104 may select the AFC tracking loop if the strength (32 dB Hz) of the acquired signal is less than the switching threshold 402 (33 dB Hz).

Figure 5:
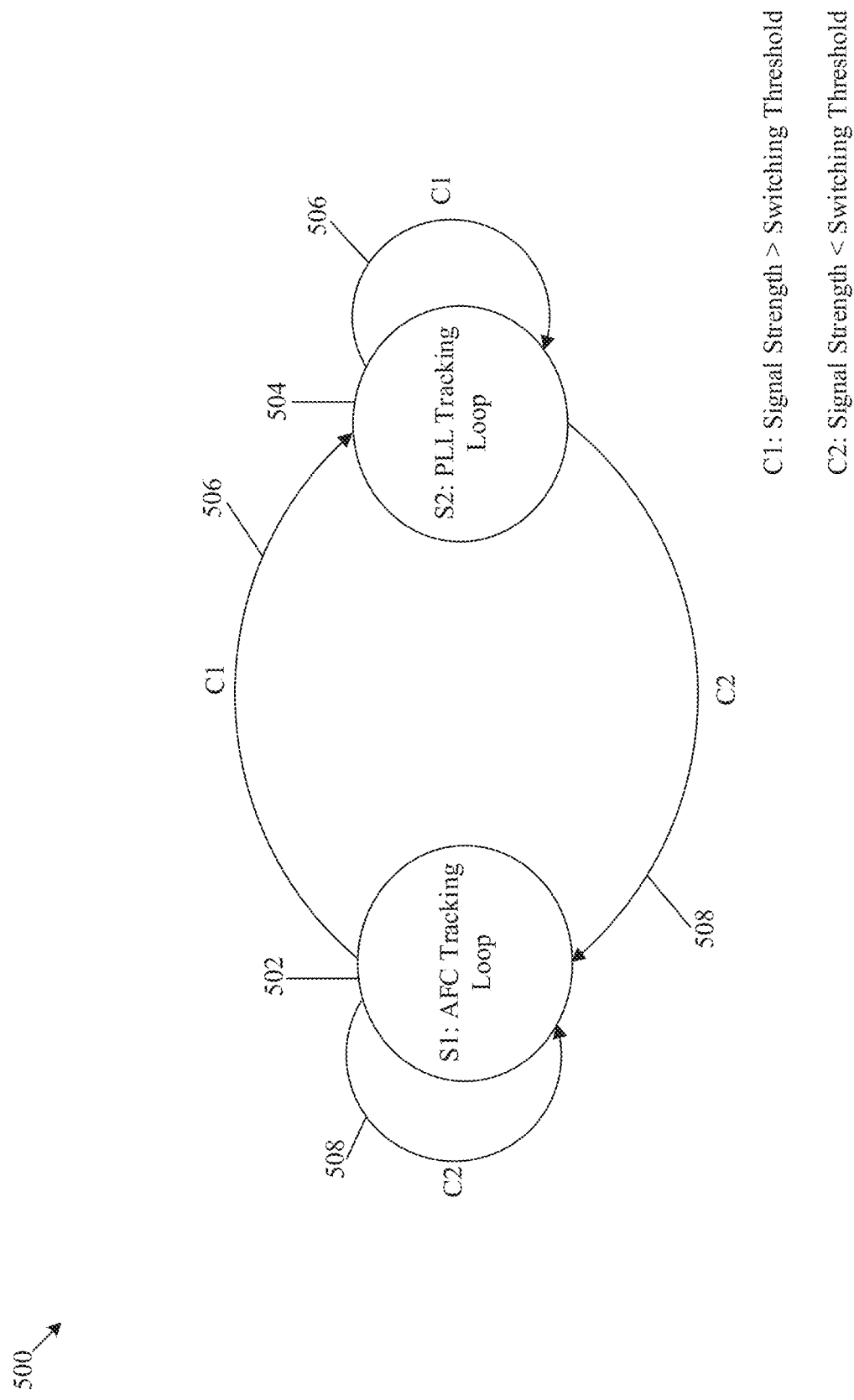
FIG. 5 is a state diagram that illustrates an exemplary scenario for switching between states that correspond to operations in tracking loops of a GNSS receiver, in accordance with an embodiment of the disclosure.

FIG. 5 is a state diagram that illustrates an exemplary scenario for switching between states that correspond to operations in tracking loops of a GNSS receiver, in accordance with an embodiment of the disclosure. FIG. 5 is explained in conjunction with elements from FIG. 1, FIG. 2, FIG. 3, and FIG. 4. With reference to FIG. 5, there is shown an exemplary scenario 500. In the exemplary scenario 500, there is shown a first state (S-1) 502 and a second state (S-2) 504. The first state 502 may correspond to selection of the AFC tracking loop of the GNSS receiver 104. The second state 504 may correspond to selection of the PLL tracking loop of the GNSS receiver 104. There is further shown a first condition (C-1) 506 and a second condition (C-2) 508. The GNSS receiver 104 may be configured to operate in or switch to the first state 502 based on a fulfilment of the second condition 508. Similarly, the GNSS receiver 104 may be configured to operate in or switch to the second state 504 based on a fulfilment of the first condition 506. The first condition 506 and the second condition 508 may be based on a signal strength of an acquired signal and an adjustable switching threshold.

In accordance with an embodiment, the first condition 506 may require that the strength of the acquired signal is greater than a switching threshold. Similarly, the second condition 508 may require that the strength of the acquired signal is less than the switching threshold. In operation, the GNSS receiver 104 may update a current value of the switching threshold based on information associated with one or more external conditions that impact the decoding, phase tracking, or frequency tracking performance of the GNSS receiver 104. The GNSS receiver 104 may be further configured to determine, based on the information about an external condition (for example, the strength of the acquired signal), whether the first condition 506 is satisfied or the second condition 508 is satisfied.

The GNSS receiver 104 may be configured to operate in the second state 504 (or switch from the first state 502 to the second state 504) to track the phase of the acquired signal by use of the PLL tracking loop, if the first condition 506 is satisfied. The tracking of the phase may improve the decoding performance of the GNSS receiver 104 and/or the phase tracking performance of the GNSS receiver 104. Alternatively, the GNSS receiver 104 may be configured to operate in the first state 502 (or switch from the second state 504 to the first state 502) to track the frequency of the acquired signal by use of the AFC tracking loop, if the second condition 508 s satisfied. The tracking of the frequency may improve the frequency tracking performance of the GNSS receiver 104.

Figure 6:
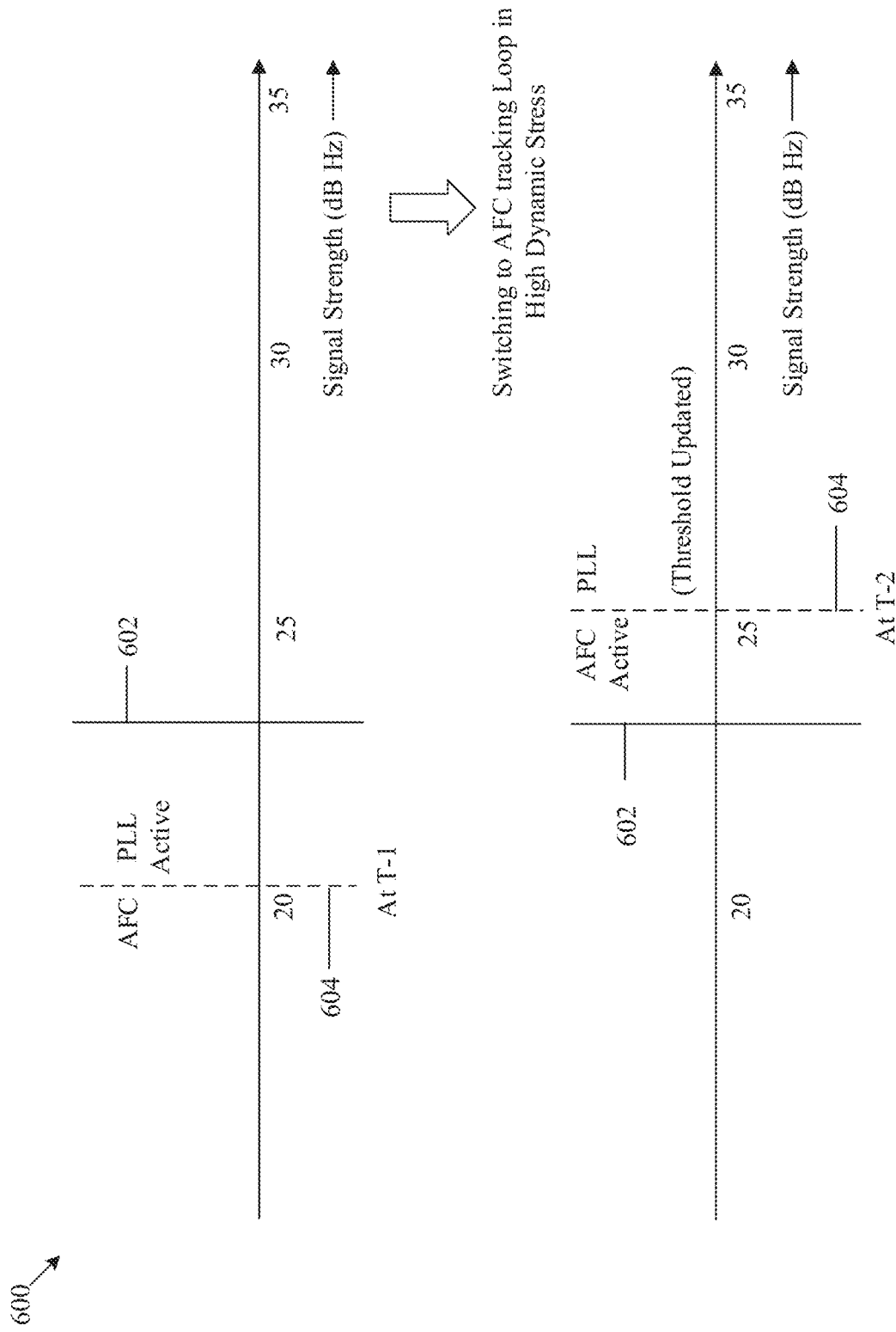
FIG. 6 is a diagram that illustrates an exemplary scenario for switching to an AFC tracking loop from a PLL tracking loop in a GNSS receiver, in accordance with an embodiment of the disclosure.

FIG. 6 is a diagram that illustrates an exemplary scenario for switching to an AFC tracking loop from a PLL tracking loop in a GNSS receiver, in accordance with an embodiment of the disclosure. FIG. 6 is explained in conjunction with elements from FIG. 1, FIG. 2, FIG. 3, FIG. 4, and FIG. 5. With reference to FIG. 6, there is shown an exemplary scenario 600. In the exemplary scenario 600 there is shown a signal 602.

At time instant T-1, the GNSS receiver 104 may be configured to receive information associated with one or more external conditions that impact the decoding performance of the GNSS receiver 104, the phase tracking performance of the GNSS receiver 104, and/or the frequency tracking performance of the GNSS receiver 104. The received information may include a plurality of inputs. For example, the plurality of inputs may include a first input that indicates an expected or actual dynamic stress experienced by the GNSS receiver 104 within a duration of operation of the GNSS receiver 104, a second input that indicates the strength of the signal 602, a third input that includes sensor data associated with a motion of the GNSS receiver 104, or a fourth input that includes a BER associated with a decoding operation for a signal previously acquired by the front-end RF unit 202 of the GNSS receiver 104 from one or more satellites of the plurality of satellites 106A . . . 106N.

In accordance with an embodiment, the GNSS receiver 104 may be configured to assign weights to each of the plurality of inputs included in the received information. The weights assigned to the first input and the third input may be directly proportional to the expected or actual dynamic stress experienced by the GNSS receiver 104. The weight assigned to the second input may be inversely proportional to the strength of the signal 602. The weight assigned to the fourth input may be directly proportional to the BER associated with the decoding operation for the previously acquired signal. The GNSS receiver 104 may be further configured determine a weighted combination based on the assigned weights of one or more inputs of the plurality of inputs. The weighted combination may use individual weights assigned to each input of the one or more inputs. The GNSS receiver 104 may set a current value (for example, 20 dB Hz) of the switching threshold 604 based on the weighted combination. In at least one embodiment, the current value of switching threshold 604 may be proportional to the weighted combination.

The GNSS receiver 104 may be configured to determine the strength of the signal 602. For example, the strength may be determined as 23 dB-Hz (approximately). The GNSS receiver 104 may compare the strength of the signal 602 with the current value of the switching threshold 604. The GNSS receiver 104 may select the PLL tracking loop based on the comparison (i.e., a determination that the strength of the signal 602 is greater than the current value of the switching threshold 604).

At T-2, the GNSS receiver 104 may be configured to adjust (update) the current value of the switching threshold 604 based on one or more inputs of the plurality of inputs. The GNSS receiver 104 may be configured to update the current value of the switching threshold 604 if it is determined that the expected or actual dynamic stress experienced by the GNSS receiver 104 is more compared to an actual dynamic stress experienced by the GNSS receiver 104 at T-1. The determination may be based on a received user input, or an input received from the motion sensor 308. For example, the user input may indicate that the user 114 intends to operate the electronic device 102 (for example, a wearable smart watch) in a 'running' mode. Further, the input received from the motion sensor 308 may indicate that the actual dynamic stress experienced by the GNSS receiver 104 at T-2 is greater than the actual dynamic stress experienced by the GNSS receiver 104 at T-1.

In accordance with an embodiment, the GNSS receiver 104 may be configured to increase the weights assigned to the first input and the third input based on the user input and the input received from the motion sensor 308. The weighted combination (determined at T-2) may increase compared to the weighted combination (determined prior to T-1) due to increase in the weights assigned to the first input and the third input. Based on the increase in the weighted combination, the GNSS receiver 104 may be configured to update (for example, increase to 25 dB Hz from 20 dB Hz) the switching threshold 604. The GNSS receiver 104 may be configured to compare the strength of the signal 602 with an updated value (i.e., 25 dB Hz) of the switching threshold 604. The GNSS receiver 104 may be configured to switch to the AFC tracking loop to track the frequency of the signal 602, based on the comparison (the strength of the signal 602 is less than the updated value of the switching threshold 704). The switching may enhance the frequency tracking performance of the GNSS receiver 104.

Figure 7:
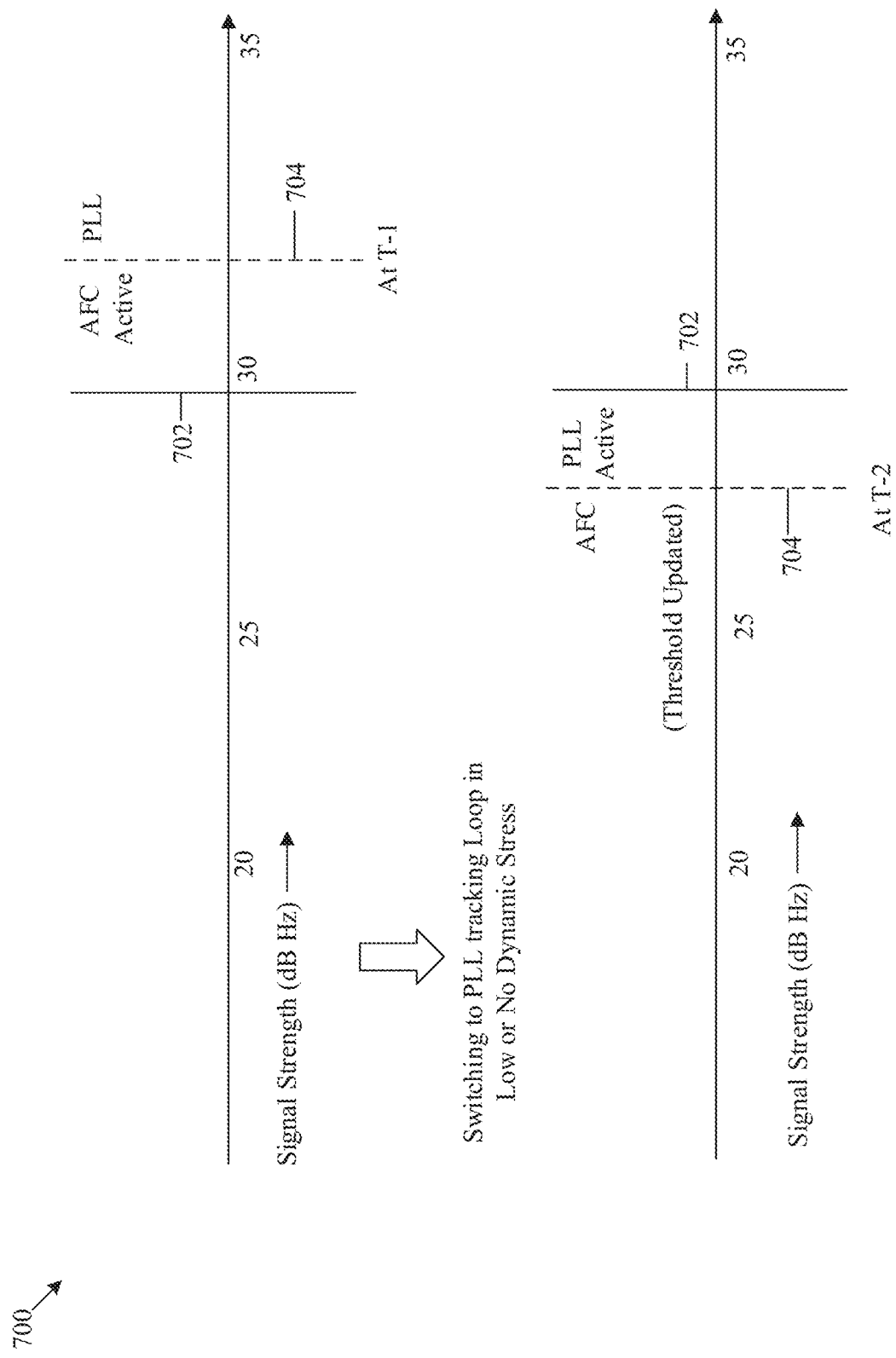
FIG. 7 is a diagram that illustrates an exemplary scenario for switching to a PLL tracking loop from an AFC tracking loop in a GNSS receiver, in accordance with an embodiment of the disclosure.

FIG. 7 is a diagram that illustrates an exemplary scenario for switching to a PLL tracking loop from an AFC tracking loop in a GNSS receiver, in accordance with an embodiment of the disclosure. FIG. 7 is explained in conjunction with elements from FIG. 1, FIG. 2, FIG. 3, FIG. 4, FIG. 5, and FIG. 6. With reference to FIG. 7, there is shown an exemplary scenario 700. In the exemplary scenario 700 there is shown a signal 702. At time instant T-1, the GNSS receiver 104 may actively use the AFC tracking loop to track the frequency of the signal 702. The GNSS receiver 104 may switch between the AFC and PLL tracking loops based on an adjustable switching threshold 704. At time instant T-2, the GNSS receiver 104 may adjust the switching threshold 704 based on an external condition (for example, a reduction in the expected or actual dynamic stress experienced by the GNSS receiver 104). The GNSS receiver 104 may be configured to switch from the AFC tracking loop to the PLL tracking loop based on the adjustment of the switching threshold 704.

In accordance with an embodiment, at T-1, the GNSS receiver 104 may be configured to receive information associated with one or more external conditions that impact the decoding performance of the GNSS receiver 104, or the phase or frequency tracking performance of the GNSS receiver 104. The received information may include a plurality of inputs (i.e., the first input, the second input, the third input, or the fourth input). The GNSS receiver 104 may set the switching threshold 704 to a current value (for example, 32 dB Hz) based on one or more of the plurality of inputs. In accordance with an embodiment, the GNSS receiver 104 may set the switching threshold 704 to the current value based on a weighted combination of one or more inputs of the plurality of inputs. In accordance with an embodiment, the GNSS receiver 104 may be further configured to adjust (update) the current value of the switching threshold 704 based on one or more inputs of the plurality of inputs received at T-1.

In an example case, the GNSS receiver 104 may determine that the strength of the signal 702 is 30 dB Hz (approximately). The GNSS receiver 104 may compare the strength of the signal 702 with the current value of the switching threshold 704. Based on the comparison (i.e., a determination that the strength of the signal 702 is less than the current value of the switching threshold 704), the GNSS receiver 104 may select the AFC tracking loop.

At T-2, the GNSS receiver 104 may be configured to update the current value of the switching threshold 704 if it is determined that the expected or actual dynamic stress experienced by the GNSS receiver 104 has reduced compared to an actual dynamic stress experienced by the GNSS receiver 104 at T-1. The determination may be based on a received user input, or an input received from the motion sensor 308. The user input may indicate that, for example, the user 114 intends to operate the electronic device 102 (for example, a wearable smart watch) in a 'walking' mode or the electronic device 102 is at rest. The input received from the motion sensor 308 may indicate that the actual dynamic stress experienced by the GNSS receiver 104 at T-2 is less than the actual dynamic stress experienced by the GNSS receiver 104 at T-1.

In accordance with an embodiment, the GNSS receiver 104 may be configured to decrease the weights assigned to the first input and the third input based on the user input and the input received from the motion sensor 308. A weighted combination determined based on the assigned weights of the one or more inputs of the plurality of inputs may decrease (compared to a weighted combination determined at T-1).

In accordance with an embodiment, the GNSS receiver 104 may be configured to update (for example, decrease to 28 dB Hz from 32 dB Hz) the switching threshold 704 based on the weighted combination determined at T-2. The GNSS receiver 104 may be configured to compare the strength of the signal 702 with an updated value (i.e., 32 dB Hz) of the switching threshold 704. Thereafter, the GNSS receiver 104 may switch to the PLL tracking loop from the AFC tracking loop, to track the phase of the signal 602, based on the comparison (i.e., the strength of the signal 702 is greater than the updated value of the switching threshold 704). The switching may enhance the phase tracking and decoding performance of the GNSS receiver 104.

Figure 8:
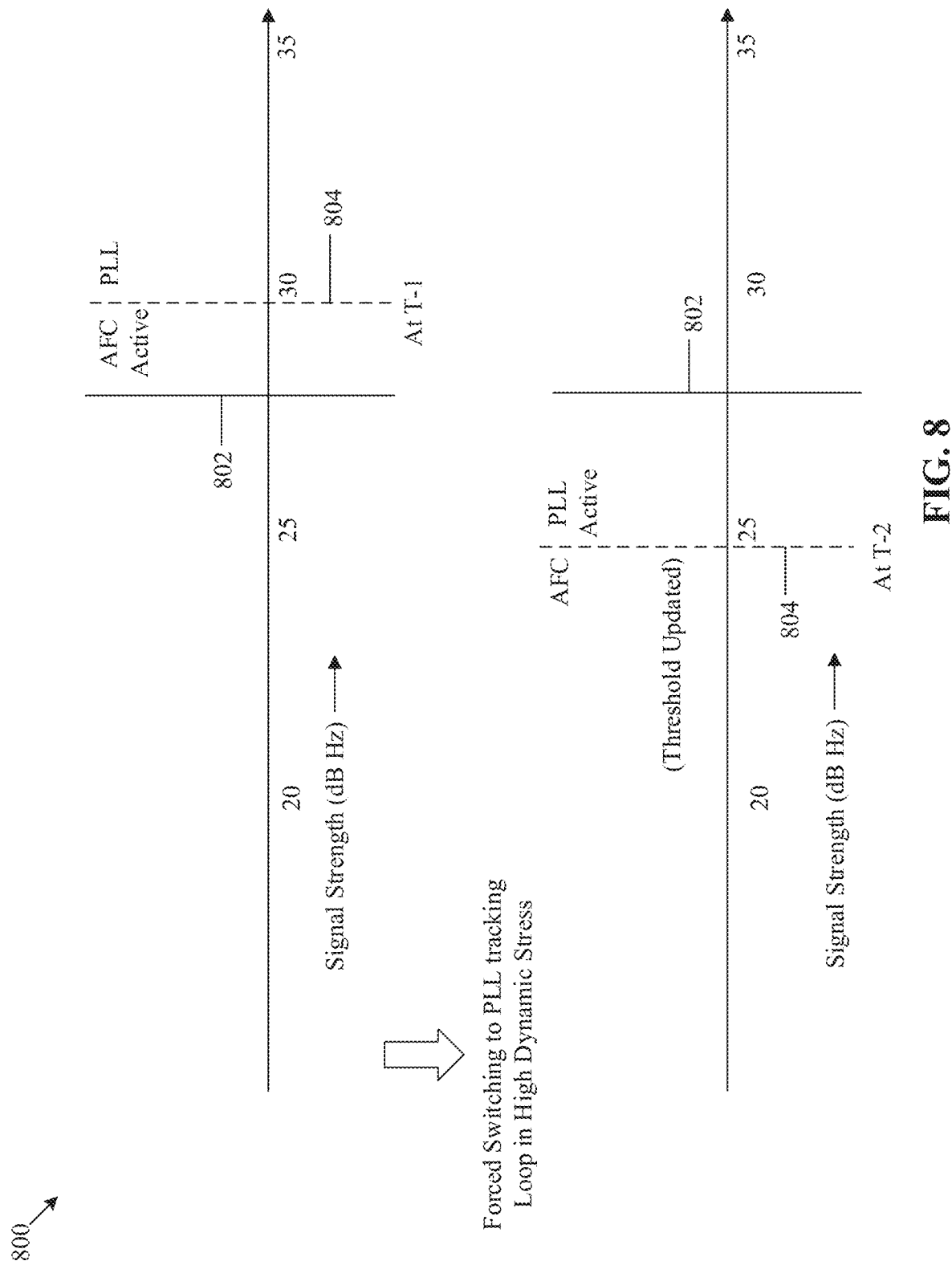
FIG. 8 is a diagram that illustrates an exemplary scenario of forceful switching to a PLL tracking loop from an AFC tracking loop in a GNSS receiver, in accordance with an embodiment of the disclosure.

FIG. 8 is a diagram that illustrates an exemplary scenario of forceful switching to a PLL tracking loop from an AFC tracking loop in a GNSS receiver, in accordance with an embodiment of the disclosure. FIG. 8 is explained in conjunction with elements from FIG. 1, FIG. 2, FIG. 3, FIG. 4, FIG. 5, FIG. 6, and FIG. 7. With reference to FIG. 8, there is shown an exemplary scenario 800. In the exemplary scenario 800 there is shown a signal 802.

At time instant T-1, the GNSS receiver 104 may actively use the AFC tracking loop to track the frequency of the signal 802. At time instant T-2, the GNSS receiver 104 may adjust the switching threshold 804 based on a requirement to decode satellite data. The GNSS receiver 104 may be configured to switch from the AFC tracking loop to the PLL tracking loop based on an adjustment of the switching threshold 804.

In accordance with an embodiment, at T-1, the GNSS receiver 104 may be configured to set the switching threshold 804 to a current value (for example, 30 dB Hz) based on one or more of the plurality of inputs (i.e., the first input, the second input, the third input, or the fourth input). The GNSS receiver 104 may be configured to determine the strength of the signal 802 as 28 dB Hz. The GNSS receiver 104 may actively use the AFC tracking loop since the strength (approximately 28 dB Hz) of the signal 802 is less than the current value of the switching threshold 804. At T-2, the GNSS receiver 104 may determine a requirement to decode satellite data. For example, the GNSS receiver 104 may determine that ephemeris data has expired. In order to decode the ephemeris data from a satellite (for example, satellite 106A), the GNSS receiver 104 may need to switch to the PLL tracking loop. The GNSS receiver 104 may adjust (update) the switching threshold 804 to facilitate switching from the AFC tracking loop to the PLL tracking loop. The update may correspond to a decrease in a value of the switching threshold 804 from the current value (30 dB Hz) to an updated value, such that strength of the signal 802 remains greater than an updated value of the switching threshold 804.

In an example embodiment, the GNSS receiver 104 may decrease the switching threshold 804 to 25 dB Hz (approximately). Thereafter, the GNSS receiver 104 may be configured to compare the strength (i.e., 28 dB Hz) of the signal 802 with the updated value (i.e., 25 dB Hz) of the switching threshold 704. The GNSS receiver 104 may select the PLL tracking loop as the tracking loop (active loop) based on the comparison (i.e., a determination that the strength of the signal 802 is greater than the updated value of the switching threshold 804). Once the switching to the PLL loop is completed, the GNSS receiver 104 may be configured to decode the ephemeris data based on tracking of the phase of the signal 802. If the strength of the signal 802 does not improve (i.e., increases beyond 28 dB Hz) after the decoding of the ephemeris data, then the GNSS receiver 104 may update (increase) the switching threshold 804 to facilitate switching to the AFC tracking loop.

Figure 9:
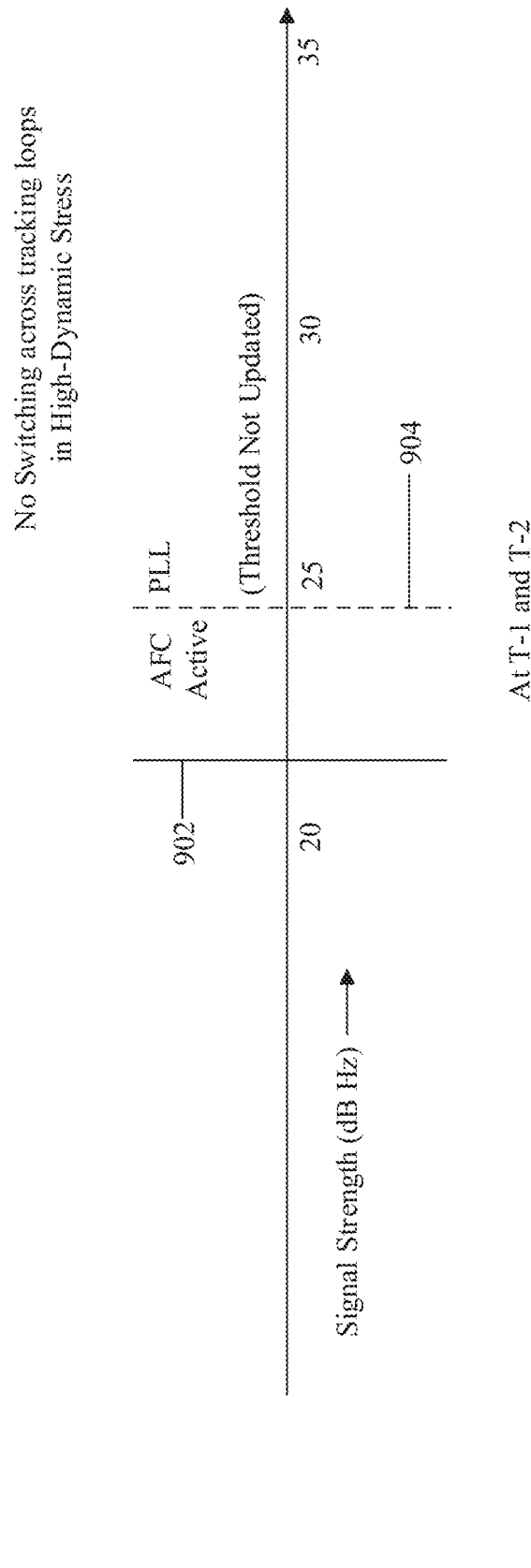
FIG. 9 is a diagram that illustrates an exemplary scenario for tracking a frequency of an acquired signal by use of an AFC tracking loop in a GNSS receiver, in accordance with an embodiment of the disclosure.

FIG. 9 is a diagram that illustrates an exemplary scenario for tracking frequency of an acquired signal by use of an AFC tracking loop in a GNSS receiver, in accordance with an embodiment of the disclosure. FIG. 9 is explained in conjunction with elements from FIG. 1, FIG. 2, FIG. 3, FIG. 4, FIG. 5, FIG. 6, FIG. 7, and FIG. 8. With reference to FIG. 9, there is shown an exemplary scenario 900. In the exemplary scenario 900 there is shown a signal 902. At time instant T-1, the GNSS receiver 104 may actively use the AFC tracking loop to track the frequency of the signal 902. Herein, the switching threshold 904 may not be adjusted at time instant T-2 based on the information associated with the one or more external conditions that impact the decoding performance of the GNSS receiver 104, or a phase or frequency tracking performance of the GNSS receiver 104.

In accordance with an embodiment, at T-1, the GNSS receiver 104 may set the switching threshold 904 to a current value (for example, 25 dB Hz) based on one or more inputs of the plurality of inputs (i.e., the first input, the second input, the third input, or the fourth input). For example, the setting of the switching threshold 904 may be based on a determination that the GNSS receiver 104 is under a high dynamic stress at T-1. The GNSS receiver 104 may determine the strength (for example, approximately 21 dB Hz) of the signal 902. Since the strength of the signal 902 (i.e., 21 dB Hz) is less than the current value of the switching threshold 904 (i.e., 25 dB Hz), the GNSS receiver 104 may continue to actively use the AFC tracking loop to track the frequency of the signal 902.

At T-2, the GNSS receiver 104 may be configured to determine whether the current value (for example, 25 dB Hz) of the switching threshold 904 requires an update. The determination may be based on the expected or actual dynamic stress experienced by the GNSS receiver 104 at T-2. The GNSS receiver 104 may determine, based on a user input or an input from the motion sensor 308, whether the expected or actual dynamic stress experienced by the GNSS receiver 104 has reduced at T-2, compared to the actual dynamic stress experienced by the GNSS receiver 104 at T-1. The GNSS receiver 104 may be configured to update the current value of the switching threshold 904 if it is determined that the expected or actual dynamic stress experienced by the GNSS receiver 104 has reduced at T-2, based on the user input or the input from the motion sensor 308.

For example, the user input, at T-2, may indicate that the user 114 intends to operate the electronic device 102 (for example, a wearable smart watch) in a 'running' mode or a swimming mode. Further, based on the input received from the motion sensor 308, the GNSS receiver 104 may determine that the actual dynamic stress experienced by the GNSS receiver 104 at T-2 is comparable to or greater than the actual dynamic stress experienced by the GNSS receiver 104 at T-1. The GNSS receiver 104 may determine that the GNSS receiver 104 continues to be in a high dynamic stress environment. In response to the determination, the GNSS receiver 104 may not update the current value of the switching threshold 904. The GNSS receiver 104 may continue to track the frequency of the signal 902 by use of the AFC tracking loop of the GNSS receiver 104 at T-2.

Figure 10:
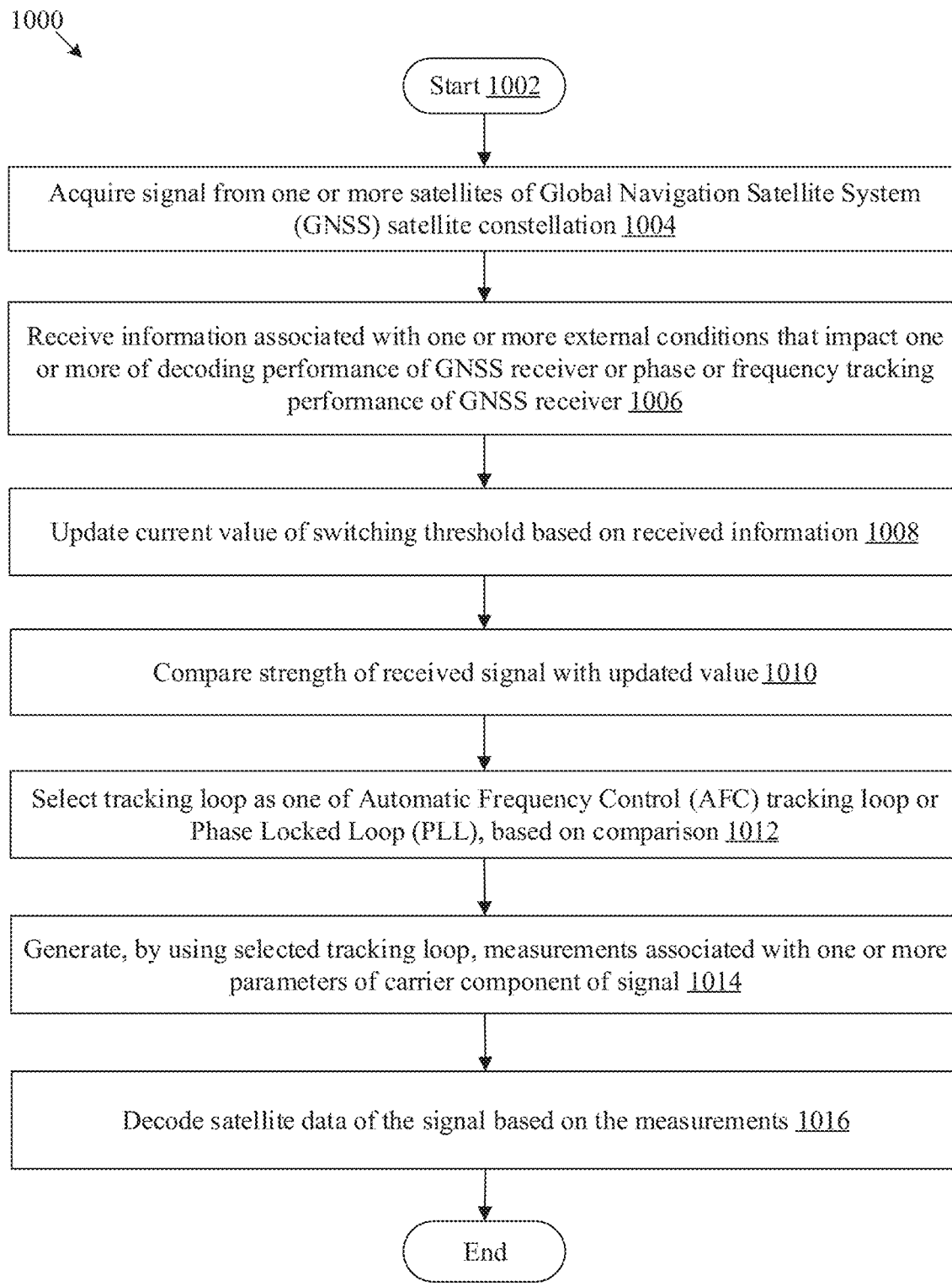
FIG. 10 is a flowchart that illustrates an exemplary method for switching between tracking loops in a GNSS receiver based on an adjustable switching threshold, in accordance with an embodiment of the disclosure.

FIG. 10 is a flowchart that illustrates operations for an exemplary method for switching between tracking loops in a GNSS receiver based on an adjustable switching threshold, in accordance with an embodiment of the disclosure. FIG. 10 is explained in conjunction with elements from FIGS. 1, 2, 3, 4, 5, 6, 7, 8, and 9. With reference to FIG. 10, there is shown a flowchart 1000. The operations from 1002 to 1016 may be implemented by any computing system, such as, by the electronic device 102, or the GNSS receiver 104 of the electronic device 102, of FIG. 1. The operations may start at 1002 and may proceed to 1004.

At 1004, a signal, from one or more satellites of the GNSS satellite constellation 106, may be acquired. In at least one embodiment, the front-end RF unit 202 of the GNSS receiver 104 may be configured to acquire the signal from the one or more satellites of the GNSS satellite constellation

106. The details of acquisition of the signal from the one or more satellites, are described, for example, in FIG. 1 and FIG. 2.

At 1006, information associated with the one or more external conditions, that impact one or more of the decoding performance of the GNSS receiver 104, or the phase or frequency tracking performance of the GNSS receiver 104, may be received. In at least one embodiment, the processor 204 may be configured to receive the information associated with the one or more external conditions that impact one or more of the decoding performance of the GNSS receiver 104, or the phase or frequency tracking performance of the GNSS receiver 104. The details of reception of the information associated with one or more external conditions are described, for example, in FIG. 1, FIG. 2, FIG. 3, FIG. 6, FIG. 7, and FIG. 9.

At 1008, a current value of the switching threshold may be updated based on the received information. In at least one embodiment, the processor 204 may be configured to update the current value of a switching threshold based on the received information. The details of updating of the current value of the switching threshold based on the received information, are described, for example, in FIG. 1, FIG. 4, FIG. 5, FIG. 6, FIG. 7, and FIG. 8.

At 1010, a strength of the acquired signal may be compared with the updated value. In at least one embodiment, the processor 204 may be configured to compare the strength of the acquired signal with the updated value of the switching threshold. The details of comparison of the strength of the acquired with the updated value, are described, for example, in FIG. 1, FIG. 5, FIG. 6, FIG. 7, and FIG. 8.

At 1012, a tracking loop, as one of the AFC tracking loop or the PLL tracking loop, may be selected based on the comparison. In at least one embodiment, the processor 204 may be configured to select the tracking loop as one of the AFC tracking loop or the PLL tracking loop, based on the comparison of the strength of the acquired signal with the updated value of the switching threshold. The details of selection of the tracking loop, are described, for example, FIG. 1, FIG. 5, FIG. 6, FIG. 7, FIG. 8, and FIG. 9.

At 1014, measurements associated with one or more parameters of a carrier component of the acquired signal may be generated by the selected tracking loop. In at least one embodiment, the processor 204 may be configured to generate, by the selected tracking loop, measurements associated with the one or more parameters of the carrier component of the acquired signal. The details of generation of the measurements associated with the one or more parameters, are described, for example, in FIG. 1.

At 1016, satellite data of the acquired signal may be decoded. In at least one embodiment, the processor 204 may be configured to decode the satellite data of the acquired signal based on the measurements. The details of decoding of the satellite data, are described, for example, in FIG. 1. Control may pass to end.

Although the flowchart 1000 is illustrated as discrete operations, such as 1004, 1006, 1008, 1010, 1012, 1014, and 1016, the disclosure is not so limited. Accordingly, in certain embodiments, such discrete operations may be further divided into additional operations, combined into fewer operations, or eliminated, depending on the implementation without detracting from the essence of the disclosed embodiments.

Various embodiments of the disclosure may provide a non-transitory computer-readable medium and/or storage medium having stored thereon, computer-executable instructions executable by a machine and/or a computer to operate an GNSS receiver (such as the GNSS receiver 104). The computer-executable instructions may cause the machine and/or computer to perform operations that include. The operations may further include. The operations may further include. The operations may further include. The operations may further include. The operations may further include. The operations may further include. The operations may further include.

Exemplary aspects of the disclosure may include a GNSS receiver (such as, the GNSS receiver 104 of FIG. 1) that may include a processor (such as, the processor 204). The GNSS receiver 104 may be included in the electronic device (such as, the electronic device 102 of FIG. 1). The GNSS receiver 104 may further include a front-end RF unit 202. The front-end RF unit 202 may be configured to acquire a signal from one or more satellites of a GNSS satellite constellation 106. The processor 204 may be configured to receive information associated with one or more external conditions that impact one or more of a decoding performance of the GNSS receiver 104 or a phase or frequency tracking performance of the GNSS receiver 104. The received information may include a user input that indicates a selection of a GNSS provider from amongst a plurality of GNSS providers. Each GNSS provider of the plurality of GNSS providers is associated with a different GNSS satellite constellation The received information may include one or more of: a first input indicative of an expected or actual dynamic stress experienced by the GNSS receiver 104 within a duration of operation of the GNSS receiver 104, a second input indicative of a strength of the acquired signal, a third input indicative of sensor data associated with a motion of the GNSS receiver 104, or a fourth input indicative of a BER associated with a decoding operation for a signal previously received by the front-end RF unit 202 from the one or more satellites of the GNSS satellite constellation 106. The processor 204 may be further configured to update a current value of a switching threshold based on the received information to obtain an updated value of the switching threshold. The updated value of the switching threshold may be greater than the current value of the switching threshold or less than the current value of the switching threshold. The processor 204 may be further configured to compare a strength of the acquired signal with the updated value. The processor 204 may be further configured to select a tracking loop as one of an AFC tracking loop or a PLL tracking loop, based on the comparison. The processor 204 may be further configured to generate, by the selected tracking loop, measurements associated with one or more parameters of a carrier component of the acquired signal. The one or more parameters correspond to a frequency or a phase of the carrier component The processor 204 may be further configured to decode satellite data of the acquired signal based on the generated measurements.

In accordance with an embodiment, the processor 204 may be further configured to assign weights to each of the one or more inputs included in the received information. The processor 204 may be further configured to determine a weighted combination of the one or more inputs based on the assigned weights. The value of the switching threshold may be further updated based on the weighted combination. The weights may be assigned based on a level of the expected or actual dynamic stress experienced by the GNSS receiver.

In accordance with an embodiment, the processor 204 may be further configured to the update the current value of the switching threshold based on a requirement associated with an acquisition of the signal. The requirement may correspond to an operation to track a frequency of the carrier component of the acquired signal or an operation to track a phase of the carrier component of the acquired signal.

In accordance with an embodiment, the processor 204 may be further configured to determine an active use of the AFC tracking loop for a first duration of operation of the GNSS receiver 104. The PLL tracking loop may be selected as the tracking loop based on the comparison of the strength of the acquired signal with the updated value of the switching threshold. The processor 204 may be further configured to switch from the AFC tracking loop to the PLL tracking loop for a second duration of operation that succeeds the first duration of operation of the GNSS receiver 104 based on the selection of the PLL tracking loop.

In accordance with an embodiment, the processor 204 may be further configured to determine an active use of the PLL tracking loop for a third duration of operation of the GNSS receiver 104. The AFC tracking loop may be selected as the tracking loop based on the comparison of the strength of the acquired signal with the updated value of the switching threshold. The processor 204 may be further configured to switch from the PLL tracking loop to the AFC tracking loop for a fourth duration of operation that succeeds the third duration of operation of the GNSS receiver 104 based on the selection of the AFC tracking loop.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the embodiment disclosed, but that the present disclosure will include all embodiments that fall within the scope of the appended claims.

What is claimed is:

1. A Global Navigation Satellite System (GNSS) receiver, comprising:
a front-end Radio Frequency (RF) unit configured to acquire a signal from one or more satellites of a GNSS satellite constellation; and
a processor configured to:
receive information associated with one or more external conditions that impact one or more of a decoding performance of the GNSS receiver or a phase or frequency tracking performance of the GNSS receiver;
update a current value of a switching threshold based on the received information to obtain an updated value of the switching threshold;
compare a strength of the acquired signal with the updated value of the switching threshold;
select a tracking loop as one of an Automatic Frequency Control (AFC) tracking loop or a Phase Locked Loop (PLL) tracking loop, based on the comparison;
generate, by the selected tracking loop, measurements associated with one or more parameters of a carrier component of the acquired signal; and
decode satellite data of the acquired signal based on the generated measurements.

2. The GNSS receiver according to claim 1, wherein the received information comprises a user input that indicates a selection of a GNSS provider from amongst a plurality of GNSS providers, and
each GNSS provider of the plurality of GNSS providers is associated with a different GNSS satellite constellation.

3. The GNSS receiver according to claim 1, wherein the received information comprises one or more of:
a first input that indicates an expected or actual dynamic stress experienced by the GNSS receiver within a duration of operation of the GNSS receiver,
a second input that indicates the strength of the acquired signal,
a third input that includes sensor data associated with a motion of the GNSS receiver, and
a fourth input that includes a Bit Error Rate (BER) associated with a decoding operation for a signal previously received by the front-end RF unit from the one or more satellites.

4. The GNSS receiver according to claim 3, wherein the processor is further configured to:
assign weights to each of one or more inputs included in the received information; and
determine a weighted combination of the one or more inputs based on the assigned weights,
wherein the updated value of the switching threshold is updated further based on the weighted combination.

5. The GNSS receiver according to claim 4, wherein the weights are assigned based on a level of the expected or actual dynamic stress experienced by the GNSS receiver.

6. The GNSS receiver according to claim 1, wherein the current value of the switching threshold is updated further based on a requirement associated with an acquisition of the acquired signal.

7. The GNSS receiver according to claim 6, wherein the requirement corresponds to an operation to track a frequency of the carrier component of the acquired signal or an operation to track a phase of the carrier component of the acquired signal.

8. The GNSS receiver according to claim 1, wherein the updated value of the switching threshold is greater than the current value of the switching threshold.

9. The GNSS receiver according to claim 1, wherein the updated value of the switching threshold is less than the current value of the switching threshold.

10. The GNSS receiver according to claim 1, wherein
the processor is further configured to determine an active use of the AFC tracking loop for a first duration of operation of the GNSS receiver,
the PLL tracking loop is selected as the tracking loop based on the comparison, and
the selection of the PLL tracking loop causes the processor to switch from the AFC tracking loop to the PLL tracking loop for a second duration of operation that succeeds the first duration of operation of the GNSS receiver.

11. The GNSS receiver according to claim 1, wherein
the processor is further configured to determine an active use of the PLL tracking loop for a third duration of operation of the GNSS receiver,
the AFC tracking loop is selected as the tracking loop based on the comparison, and
the selection of the AFC tracking loop causes the processor to switch from the PLL tracking loop to the AFC tracking loop for a fourth duration of operation that succeeds the third duration of operation of the GNSS receiver.

12. The GNSS receiver according to claim 1, wherein the one or more parameters correspond to a frequency or a phase of the carrier component.

13. A method, comprising:
in a Global Navigation Satellite System (GNSS) receiver:
acquiring, by a front-end Radio Frequency (RF) unit in the GNSS receiver a signal from one or more satellites of a GNSS satellite constellation;
receiving information associated with one or more external conditions that impact one or more of a decoding performance of the GNSS receiver or a phase or frequency tracking performance of the GNSS receiver;
updating a current value of a switching threshold based on the received information to obtain an updated value of the switching threshold;
comparing a strength of the acquired signal with the updated value of the switching threshold;
selecting a tracking loop as one of an Automatic Frequency Control (AFC) tracking loop or a Phase Locked Loop (PLL) tracking loop, based on the comparison;
generating, by the selected tracking loop, measurements associated with one or more parameters of a carrier component of the acquired signal; and
decoding satellite data of the acquired signal based on the generated measurements.

14. The method according to claim 13, wherein
the received information comprises a user input that indicates a selection of a GNSS provider from amongst a plurality of GNSS providers, and
each GNSS provider of the plurality of GNSS providers is associated with a different GNSS satellite constellation.

15. The method according to claim 13, wherein the received information comprises one or more of:
a first input that indicates an expected or actual dynamic stress experienced by the GNSS receiver within a duration of operation of the GNSS receiver,
a second input that indicates the strength of the acquired signal,
a third input that includes sensor data associated with a motion of the GNSS receiver, and
a fourth input that includes a Bit Error Rate (BER) associated with a decoding operation for a signal previously received by the front-end RF unit from the one or more satellites.

16. The method according to claim 15, further comprising:
assigning weights to each of one or more inputs included in the received information; and
determining a weighted combination of the one or more inputs based on the assigned weights,
wherein the updated value of the switching threshold is updated further based on the weighted combination.

17. The method according to claim 13, further comprising:
determining an active use of the AFC tracking loop for a first duration of operation of the GNSS receiver, wherein
the PLL tracking loop is selected as the tracking loop based on the comparison, and
the selection of the PLL tracking loop causes the GNSS receiver to switch from the AFC tracking loop to the PLL tracking loop for a second duration of operation that succeeds the first duration of operation of the GNSS receiver.

18. The method according to claim 13, further comprising:
determining an active use of the PLL tracking loop for a third duration of operation of the GNSS receiver, wherein
the AFC tracking loop is selected as the tracking loop based on the comparison, and
the selection of the AFC tracking loop causes the GNSS receiver to switch from the PLL tracking loop to the AFC tracking loop for a fourth duration of operation that succeeds the third duration of operation of the GNSS receiver.

19. The method according to claim 13, wherein the one or more parameters correspond to a frequency or a phase of the carrier component.

20. An electronic device, comprising:
a Global Navigation Satellite System (GNSS) receiver that comprises:
a front-end Radio Frequency (RF) unit configured to acquire a signal from one or more satellites of a GNSS satellite constellation; and
a processor configured to:
receive information associated with one or more external conditions that impact one or more of a decoding performance of the GNSS receiver or a phase or frequency tracking performance of the GNSS receiver;
update a current value of a switching threshold based on the received information to obtain an updated value of the switching threshold;
compare a strength of the acquired signal with the updated value of the switching threshold;
select a tracking loop as one of an Automatic Frequency Control (AFC) tracking loop or a Phase Locked Loop (PLL) tracking loop, based on the comparison;
generate, by the selected tracking loop, measurements associated with one or more parameters of a carrier component of the acquired signal; and
decode satellite data of the acquired signal based on the generated measurements.

* * * * *